(12) United States Patent
Chen et al.

(10) Patent No.: US 11,403,796 B2
(45) Date of Patent: Aug. 2, 2022

(54) GPU-ACCELERATED LOCALLY INJECTIVE SHAPE DEFORMATION

(71) Applicants: MAX-PLANCK-GESELLSCHAFT ZUR FÖRDERUNG D. WISSENSCHAFTEN E.V., Munich (DE); BAR-ILAN UNIVERSITY, Ramat Gan (IL)

(72) Inventors: Renjie Chen, Saarbrücken (DE); Ofir Weber, Ra'anana (IL)

(73) Assignees: Max-Planck-Gesellschaft Zur Förderung D. Wissenschaften E.V., Munich (DE); Bar-Ilan University, Ramat Gan (IL)

( * ) Notice: Subject to any disclaimer, the term of this patent is extended or adjusted under 35 U.S.C. 154(b) by 0 days.

(21) Appl. No.: 15/817,225

(22) Filed: Nov. 19, 2017

(65) Prior Publication Data
US 2019/0156534 A1  May 23, 2019

(51) Int. Cl.
| | |
|---|---|
| *G06T 11/60* | (2006.01) |
| *G06T 1/20* | (2006.01) |
| *G06T 7/50* | (2017.01) |
| *G06T 11/20* | (2006.01) |
| *G06T 13/80* | (2011.01) |

(52) U.S. Cl.
CPC ................ *G06T 11/60* (2013.01); *G06T 1/20* (2013.01); *G06T 7/50* (2017.01); *G06T 11/203* (2013.01); *G06T 13/80* (2013.01)

(58) Field of Classification Search
CPC .................................. G06T 11/60; G06T 1/20
See application file for complete search history.

(56) References Cited

U.S. PATENT DOCUMENTS

| | | | | |
|---|---|---|---|---|
| 8,400,472 | B2* | 3/2013 | Weber | G06T 13/80 345/647 |
| 2006/0267978 | A1* | 11/2006 | Litke | G06T 17/20 345/419 |
| 2009/0284529 | A1* | 11/2009 | De Aguiar | G06T 13/40 345/420 |
| 2012/0120074 | A1* | 5/2012 | Huysmans | G06T 17/205 345/420 |
| 2014/0104295 | A1* | 4/2014 | Sorkine-Hornung | G09G 5/00 345/589 |
| 2014/0114620 | A1* | 4/2014 | Grinspun | A41H 3/007 703/1 |
| 2015/0029198 | A1* | 1/2015 | Sumner | G06T 13/20 345/474 |
| 2015/0356704 | A1* | 12/2015 | Lipman | G06T 3/0093 703/1 |

* cited by examiner

*Primary Examiner* — Samantha (Yuehan) Wang
(74) *Attorney, Agent, or Firm* — Siritzky Law, PLLC

(57) ABSTRACT

A computer-implemented method for shape deformation, comprising: obtaining an image; obtaining one or more positional constraints; determining a shape deformation/image map, based on the positional constraints; applying the shape deformation to the image; and outputting the image.

16 Claims, 13 Drawing Sheets
(11 of 13 Drawing Sheet(s) Filed in Color)

Figure 5 (Table 1)

| | $E(\sigma_1, \sigma_2)$ | $E(x,y) = E(|f_z|^2, |f_{\bar{z}}|^2)$ | | Eigenvalues |
|---|---|---|---|---|
| $E_{iso}$ | $\frac{1}{2}(\sigma_1^2 + \sigma_2^2 + \sigma_1^{-2} + \sigma_2^{-2})$ | $E_{iso} = (x+y)\left(1 + \frac{1}{(x-y)^2}\right)$ | $(\alpha_1, \alpha_2, \beta_1, \beta_2, \beta_3)^T$ $\begin{cases}\alpha_1^{iso} = 1 - (x+y)(x-y)^{-3} \\ \alpha_2^{iso} = 1 + (3x+y)(x-y)^{-3} \\ \beta_1^{iso} = 2(x+5y)(x-y)^{-4} \\ \beta_2^{iso} = 2(5x+y)(x-y)^{-4} \\ \beta_3^{iso} = -6(x+y)(x-y)^{-4}\end{cases}$ | $\underline{2\alpha_1}, 2\alpha_2, \lambda_3, \lambda_4$ |
| $E_{exp}$ | $\exp\left(s\left(\frac{1}{2}(\sigma_1^2 + \sigma_2^2 + \sigma_1^{-2} + \sigma_2^{-2})\right)\right)$ | $\exp\left(s(x+y)\left(1+\frac{1}{(x-y)^2}\right)\right)$ | $sE_{exp}\begin{cases}\alpha_1^{iso}\\ \alpha_2^{iso}\\ \beta_1^{iso} + s(\alpha_1^{iso})^2 \\ \beta_2^{iso} + s(\alpha_2^{iso})^2 \\ \beta_3^{iso} + s\alpha_1^{iso}\alpha_2^{iso}\end{cases}$ | $\underline{2\alpha_1}, 2\alpha_2, \lambda_3, \lambda_4$ |
| $E_{AMIPS}$ | $\exp\left(s\left(\frac{\sigma_1}{\sigma_2} + \frac{\sigma_2}{\sigma_1}\right) + (\sigma_1\sigma_2 + \sigma_1^{-1}\sigma_2^{-1})\right)$ | $\exp\left(\frac{2s(x+y)+1}{x-y} + x - y\right)$ | $\begin{pmatrix}(1-(4sy+1)(x-y)^{-2})E_{AMIPS}\\ (-1+(4sx+1)(x-y)^{-2})E_{AMIPS}\\ \alpha_1^2 E_{AMIPS}^{-1} + 2(4sy+1)(x-y)^{-3}E_{AMIPS}\\ \alpha_2^2 E_{AMIPS}^{-1} + 2(4sx+1)(x-y)^{-3}E_{AMIPS}\\ \alpha_1\alpha_2 E_{AMIPS} - (4sx+4sy)(x-y)^{-3}E_{AMIPS}\end{pmatrix}$ | $\underline{2\alpha_1}, 2\alpha_2, \lambda_3, \lambda_4$ |

Figure 8
(Algorithm 1)

---

Algorithm 1 Modified Newton Solver

---

Input: $(\varphi, \psi)$      ▸ initialization - locally injective map
  $p_i \in \mathcal{P} \subset \Omega, \quad q_i \in \mathcal{C}$      ▸ P2P constraints
 Output: $(\varphi, \psi)$      ▸ new locally injective map

---

1: DoPreprocessing()      ▸ Appendix G
2: loop      ▸ Newton iterations
3:   $E_{Def}^f \leftarrow E^f + \lambda E_{p2p}^f$      ▸ evaluate energy
4:   $g \leftarrow \nabla E^f + \lambda \nabla E_{p2p}^f$      ▸ evaluate gradients (G.7),(G.9)
5:   $H \leftarrow \nabla^2 E^{f+} + \lambda \nabla^2 E_{p2p}^f$      ▸ modified Hessian (G.10)
6:   $(H, g) \leftarrow \text{EliminateVariables}(H, g)$      ▸ Section 5
7:   $Hd = -g$, where $d = \begin{bmatrix} d_\varphi \\ d_\psi \end{bmatrix}$      ▸ solve (1) using Cholesky
8:   $(\varphi, \psi, t) \leftarrow \text{LineSearch}(E_{Def}^f, d, g, \varphi, \psi)$      ▸ backtracking
9:   if $t \|d\| \leq \epsilon$ then      ▸ solver converged
10:    return $(\varphi, \psi)$
11:   end if
12: end loop

---

13: procedure LineSearch($E_{Def}^f, d, g, \varphi, \psi$)      ▸ Appendix G
14:   $t \leftarrow 1$
15:   repeat
16:    $(f_z^t, \overline{f_{\bar{z}}^t}) \leftarrow \text{ComputeWirtinger}()$      ▸ Equation (G.11)
17:    if $E_{Def}^f(f_z^t, \overline{f_{\bar{z}}^t}) < E_{Def}^f + c\, t(d^T g)$ then      ▸ $c \in (0, 1)$
18:     if (27) and (30) hold then      ▸ locally injective
19:      return $(\varphi + t d_\varphi, \psi + t d_\psi, t)$
20:     end if
21:    end if
22:    $t \leftarrow t/2$
23:   until MaxNumSteps
24: end procedure

Figure 11
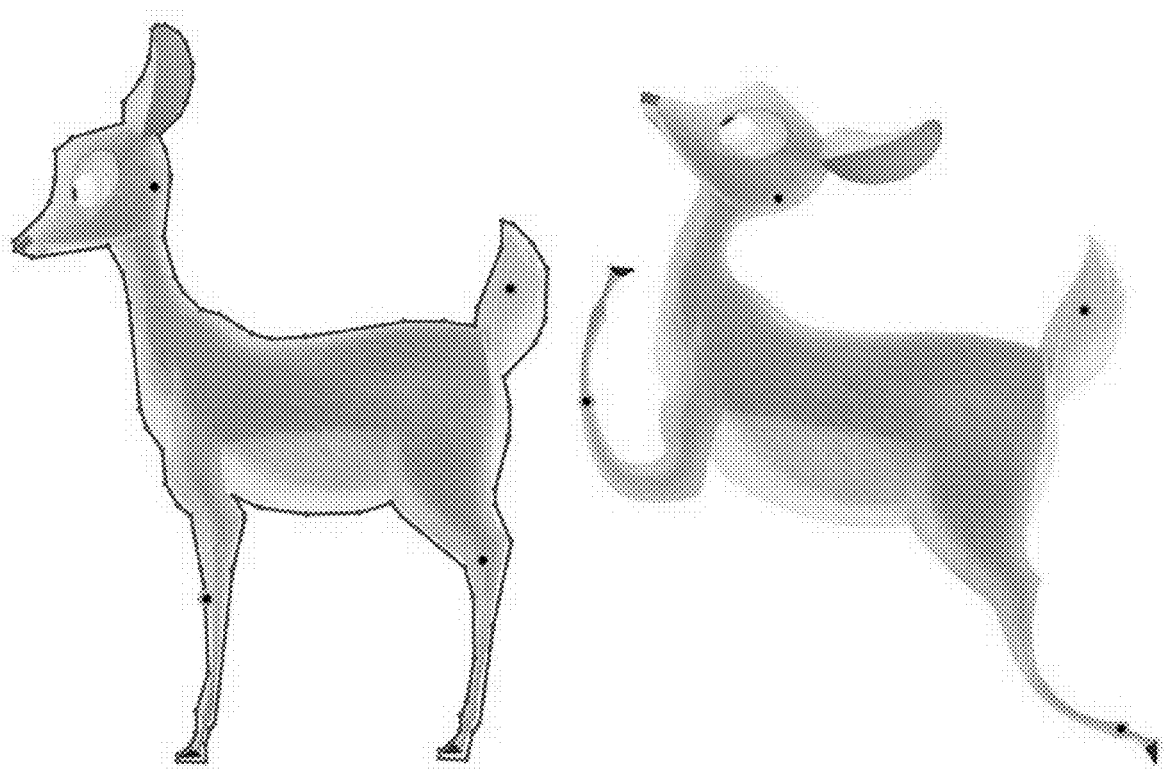
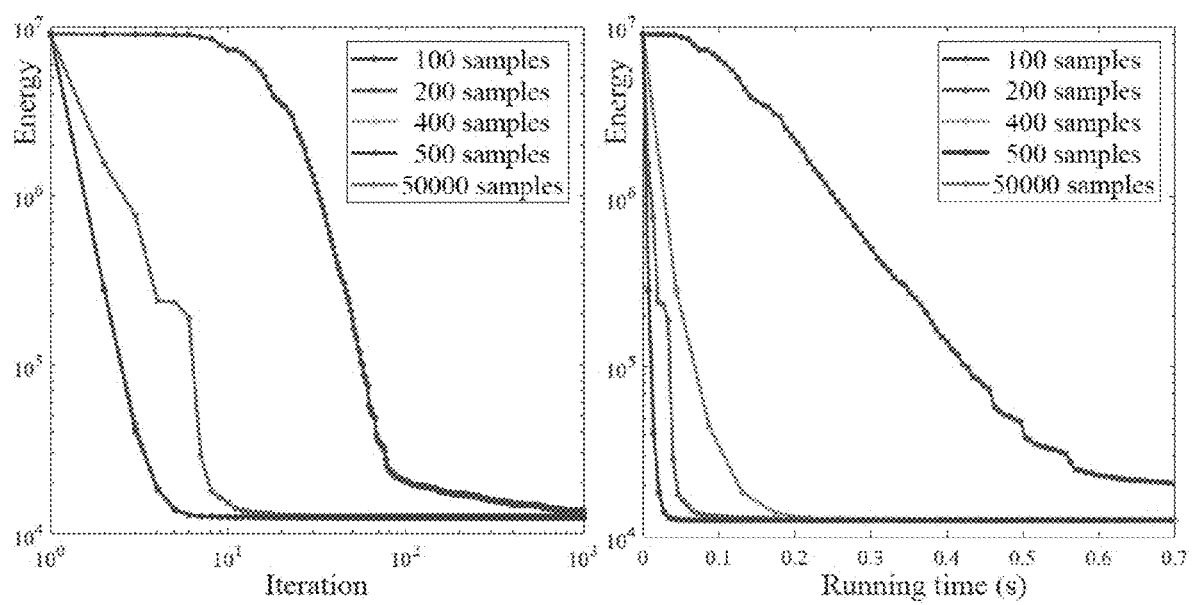

(Table 2)**

| | DOF | Ours/GPU | Ours/CPU | Newton Eigen | LBFGS | SLIM | AQP / Initialization | |
|---|---|---|---|---|---|---|---|---|
| deer | 364 | 8.87 | 38.8 | 49.6 | 54.4 | 58.3 | 7.84 | 1239.7 |
| archery | 596 | 15.31 | 71.2 | 95.1 | 88.3 | 59.4 | 9.27 | 1266.3 |
| giraffe | 624 | 14.05 | 58.1 | 86.8 | 54.9 | 56.4 | 8.27 | 1182.9 |
| rex | 392 | 11.7 | 61.6 | 77.6 | 49.5 | 57.2 | 8.52 | 1141.0 |
| racoon | 320 | 7.25 | 34.4 | 39.9 | 68.1 | 53.7 | 9.01 | 904.6 |
| raptor | 416 | 10.18 | 45.2 | 56.5 | 82.3 | 55.1 | 8.64 | 883.4 |

GPU-ACCELERATED LOCALLY INJECTIVE SHAPE DEFORMATION

The present invention relates to a method and a device for deforming shapes in images.

INTRODUCTION

Shape deformation is a classical problem in computer graphics and animation that comes in a variety of forms and settings. Essential to all variants is the requirement to compute a map between different spaces with some desirable properties. Common choices include maps between curved manifolds embedded in $R^3$, volumetric maps between solid shapes in $R^3$, and mixed dimensional maps where, for example, a curved 2-manifold embedded in $R^3$ is mapped to $R^2$ (a parameterization).

Depending on the precise user requirements, even a simplified setting using planar maps, where both the source and target domains are subsets of $R^2$, is challenging to deal with.

Some requirements such as smoothness are easily achievable while other, such as local injectivity or strict bound on the induced metric distortion are hard, sometimes impossible to guarantee. The goal is to be able to compute a map that adheres to these positional constraints yet at the same time is visually plausible. Plausibility is usually quantified by smoothness and the amount of metric distortion, which can be either minimized on the average, or bounded above by some user-defined amount. Moreover, the map is expected to be locally injective, preventing degeneracies of the image and local overlaps while allowing global ones. These requirements pose a great computational challenge since they usually lead to a nonconvex optimization problem with many degrees of freedom for which finding an optimal solution (or even just a feasible one) is often intractable.

Recent advances in the computation of locally injective and/or bounded distortion maps allow artists to produce high quality results with greater than ever success rates but the performance of current methods is still significantly worse compared to simple linear methods (Weber Ofir, Ben-Chen Mirela, and Gotsman Craig. 2009. Complex Barycentric Coordinates with Applications to Planar Shape Deformation. Computer Graphics Forum 28, 2 (2009), 587-597).

It is therefore an object of the invention, to provide a computationally efficient method and a device for shape deformation of an image that produces visually plausible results.

This object is achieved by a method and a computer program product according to the independent claims. Advantageous embodiments are defined in the dependent claims.

According to the invention, the deformation problem is cast as a nonlinear nonconvex unconstrained minimization problem that is performed in a reduced deformable subspace of harmonic maps. The user is allowed to pick among a variety of smooth energies that measure isometric distortion.

The method according to the invention broadens the scope of previous research on harmonic maps from simply-connected to multiply-connected domains (disks with finite number of holes) such as those appearing in FIGS. 2, 4, 9. In particular, the method extends the harmonic subspace of the Bounded Distortion Harmonic Mappings (BDHM) method ([Chen and Weber 2015] Chen Renjie and Weber Ofir. 2015. Bounded distortion harmonic mappings in the plane. ACM Transactions on Graphics 34, 4, Article 73 (2015)) to multiply-connected domains, as well as generalizes the bounded distortion theorem of BDHM. Furthermore, a much tighter analysis of the Lipschitz constants provided in BDHM is provided, leading to more accurate validation of the map and faster convergence.

A custom-made Newton solver is constructed with features efficiently addressing the deformation problem. The quality of the produced maps is superior and comparable to the other methods that operate within the harmonic subspace. However, the inventive method is orders of magnitude faster than existing techniques. The optimization is based on a second-order Newton approach which ensures that the convergence rate is high. In general, a single Newton iteration can be slow due to various reasons such as the need to approximate the Hessian numerically using finite differences (when analytical expressions are unavailable), as well as the need to modify the Hessian such that it becomes positive definite, which is necessary to ensure convergence to a local minimum.

The inventive solver overcomes these issues due to several unique properties, such as having closed-form expressions for the map, and its differentials, and an analytic modification scheme for the Hessian to ensure its positive definiteness. Combining these benefits leads to a Newton iteration that is considerably faster than a standard Newton iteration. Together with the small number of iterations that are typically required for convergence, the total running time of our solver is significantly shorter compared to state-of-the-art solvers. Moreover, every iteration of our solver is embarrassingly parallelized and perfectly suites implementation on massively parallel graphics processing units due to the structure and regularity of the problem. This allows for unprecedented performance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other aspects and advantages of the present invention will become more apparent when considering the following detailed description of an embodiment of the invention, in connection with the drawing, in which:

FIG. 5: is a table (Table 1) listing several possible choices for smooth isometric energies in different embodiments of the invention.

FIG. 8: shows, in pseudo-code, an algorithm (Algorithm 1) for a Newton solver used to determine an image deformation map according to an embodiment of the invention.

FIG. 11 shows the effect of changing the number of Hessian samples |H| on the algorithm according to an embodiment of the invention, when applied to the depicted deformation of the deer.

DETAILED DESCRIPTION

According to an embodiment of the invention, an interactive deformation method is described that is driven by user specified positional constraints. That is, the user selects a small set of points in the source domain which is visualized as a textured image, and interactively drags them around to new positions.

Figure 1:
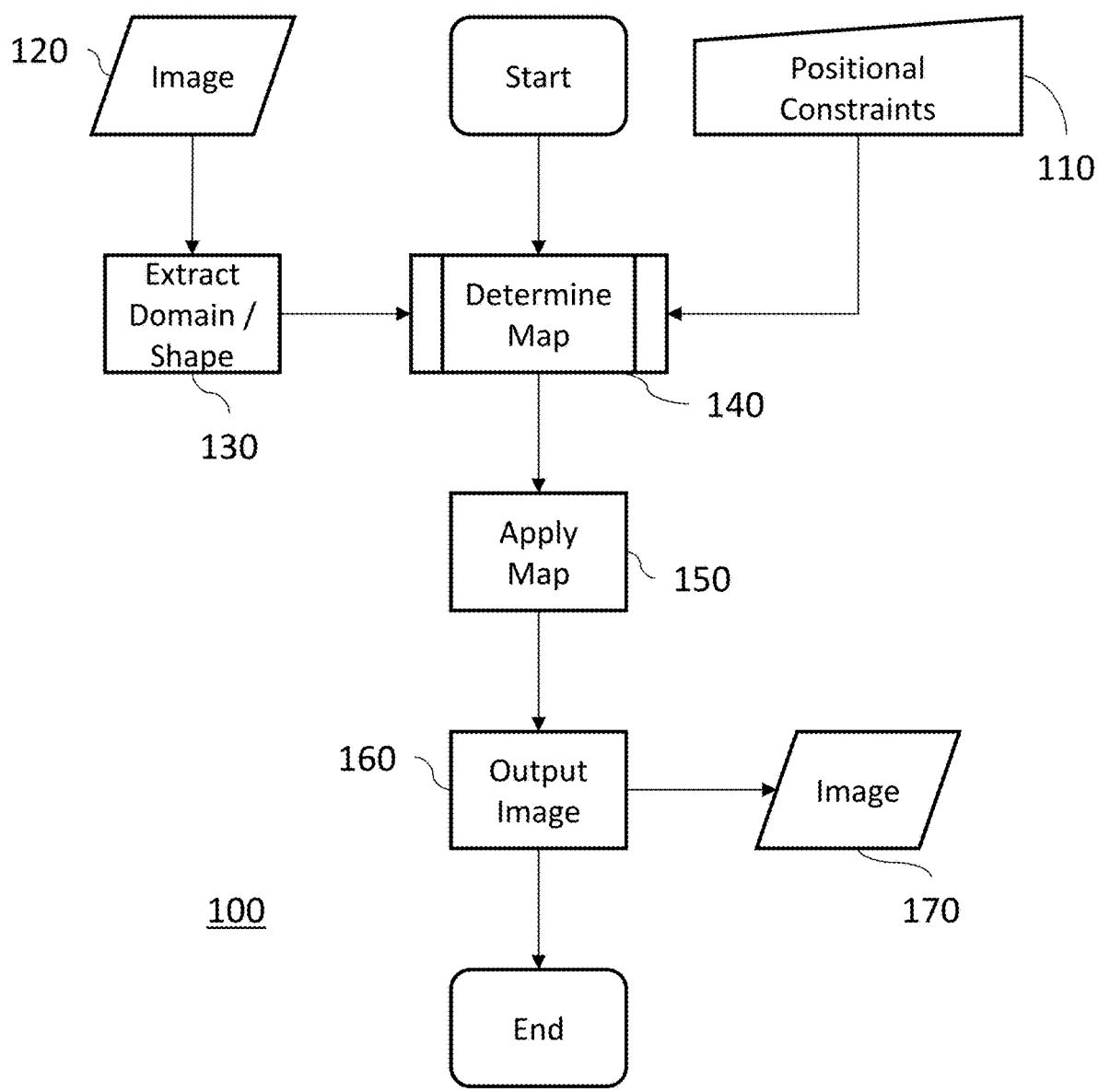
FIG. 1 shows a schematic flowchart of a method for image deformation according to an embodiment of the invention.

FIG. 1 shows a schematic flowchart of a method 100 for image deformation according to an embodiment of the invention. A user enters a set of positional constraints 110. In step 140, an image deformation map is determined, based on the positional constraints and a domain, i.e. a shape, extracted from an image 120 in step 130. In step 140, the image deformation map is applied to the extracted shape, in order to obtain a deformed image 170. The deformed image 170 is output in step 160.

According to the present embodiment of the invention, the image deformation map is a harmonic planar map.

A real-valued function $u(x,y)$: $\Omega \rightarrow R$, is harmonic if it satisfies the Laplace equation $u_{xx}+u_{yy}=0$. A planar harmonic map is a map $f: \Omega \rightarrow R^2$ where $f=[u(x,y),v(x,y)]$, and the component functions u and v are harmonic. When $R^2$ is identified with the complex plane C using complex notation $z=x+iy$, one can express f as a complex-valued function $f(z)=u(z)+iv(z)$. Thus a complex valued harmonic function $f: \Omega \subset C \rightarrow C$ can be interpreted as a harmonic planar map. A complex-valued function $f=u+iv$ is said to be holomorphic if it satisfies the Cauchy-Riemann equations. $f(z)$ is called anti-holomorphic if $\overline{f(z)}$ is holomorphic.

The Wirtinger derivatives of a complex-valued function are defined as follows: $f_z:=½(f_x-if_y)$ and $f_{\bar{z}}:=½(f_x+if_y)$.

Using the Wirtinger derivatives, the Cauchy-Riemann equations are expressed concisely as $f_{\bar{z}}=0$. The Laplacian $f_{xx}+f_{yy}$ is concisely expressed as $4f_{z\bar{z}}$, hence the condition for harmonicity (of Ref and Imf) is simply $f_{z\bar{z}}=0$. It is then easy to see that the real and imaginary components of a holomorphic function are harmonic. The same is true for anti-holomorphic functions. The converse is not true since $f_{z\bar{z}}=0$ does not imply $f_{\bar{z}}=0$ nor $f_z=0$.

The Wirtinger derivatives are useful for defining many of the local geometric distortion quantities of a $C^1$ planar map. The local change in area is: $\det(J_f)=|f_z|^2-|f_{\bar{z}}|^2$, where $J_f$ is the 2×2 Jacobian matrix of the map. A C1 map $f$ is locally injective and orientation preserving at a neighborhood of a point z if $\det(J_f(z))>0$, or alternatively if $|f_z(z)|>|f_{\bar{z}}(z)|$.

Isometric and conformal distortion measures are typically formulated in terms of the singular values of $J_f$, $0 \leq \sigma_2 \leq \sigma_1$:

$$\sigma_1(z)=|f_z|+|f_{\bar{z}}|, \sigma_2(z)=||f_z|-|f_{\bar{z}}|| \qquad (2)$$

For orientation preserving locally injective maps, the expression on the right simplifies to $\sigma_2(z)=|f_z|-|f_{\bar{z}}|>0$. The little dilatation $k(z)=|f_{\bar{z}}(z)|/|f_z(z)|$ is a measure of conformal distortion.

The invention generalizes existing techniques that are designed for simply-connected domains to multiply-connected domains. The construction is based on the following theorem, proven by the inventors:

Theorem (Harmonic Decomposition). Let $\Omega$ be a multiply connected planar domain with N holes $K_1, \ldots, K_N$, and choose N arbitrary points $\rho_i$ in $K_i$. Then, any harmonic map $f: \Omega \rightarrow C$ can be represented as:

$$f(z) = \tilde{\Phi}(z) + \overline{\tilde{\Psi}(z)} + \sum_{i=1}^{N} \omega_i \text{Ln}|z-\rho_i| \qquad (3)$$

where $\tilde{\Phi}, \tilde{\Psi}: \Omega \rightarrow C$ are holomorphic functions, and $\omega_1, \ldots, \omega_N$ are some complex coefficients.

The harmonic decomposition (3) is unique up to an additive complex constant that can be chosen by setting e.g. $\tilde{\Psi}(z_0)=0$ for an arbitrary point $z0 \in \Omega$. Theorem Harmonic Decomposition extends a similar result for simply-connected domains for which the summation term in (3) is missing. While $\tilde{\Phi}(z)+\overline{\tilde{\Psi}(z)}$ is still harmonic on multiply-connected domains, the additional summation term is essential to represent certain harmonic maps and without it, the representation is incomplete.

The main theoretical result in [Chen and Weber 2015] is a boundary value characterization of the injectivity and the conformal and isometric distortion of planar harmonic maps on simply-connected domains. We generalize this result to the multiply-connected case:

Theorem (Bounded Distortion). A planar harmonic map $f: \Omega \rightarrow C$ on a multiply-connected domain with exterior boundary curve $\gamma 0$ oriented counterclockwise and interior boundary curves $\gamma_1 \ldots \gamma_N$ oriented clockwise, is locally injective with an upper bound $k \in [0, 1)$ on the conformal distortion, a lower bound $\sigma 2>0$ on the small singular value of the Jacobian, and an upper bound $\sigma 1<\infty$ on the large singular value at every point z in $\Omega$ if and only if:

$$\oint_{\gamma_0} \frac{f'_{\bar{z}}(w)}{f_z(w)} dw + \sum_{i=1}^{N} \oint_{\gamma_i} \frac{f'_{\bar{z}}(w)}{f_z(w)} dw = 0, \qquad (4a)$$

$$0 \leq k(w) \leq k \ \forall w \in \partial\Omega, \qquad (4b)$$

$$\sigma_1(w) \leq \sigma_1 \ \forall w \in \partial\Omega, \qquad (4c)$$

$$\sigma_2 \leq \sigma_2(w) \ \forall w \in \partial\Omega. \qquad (4d)$$

Intuitively, Theorem Bounded Distortion states that in order to induce global distortion bounds, it is sufficient to bound the distortion of a harmonic map on the boundary curves $\gamma_i$ as long as (4a) holds. The boundary integral condition (4a) is equivalent to the condition that $fz$ is nonvanishing throughout the domain. Namely that $f_z(z) \neq 0$. In contrast to the simply-connected domain, the integral over the exterior boundary $\gamma_0$ may be nonzero. This gives rise to maps which are not regular homotopic to the identity map but can still be locally injective.

Figure 2:
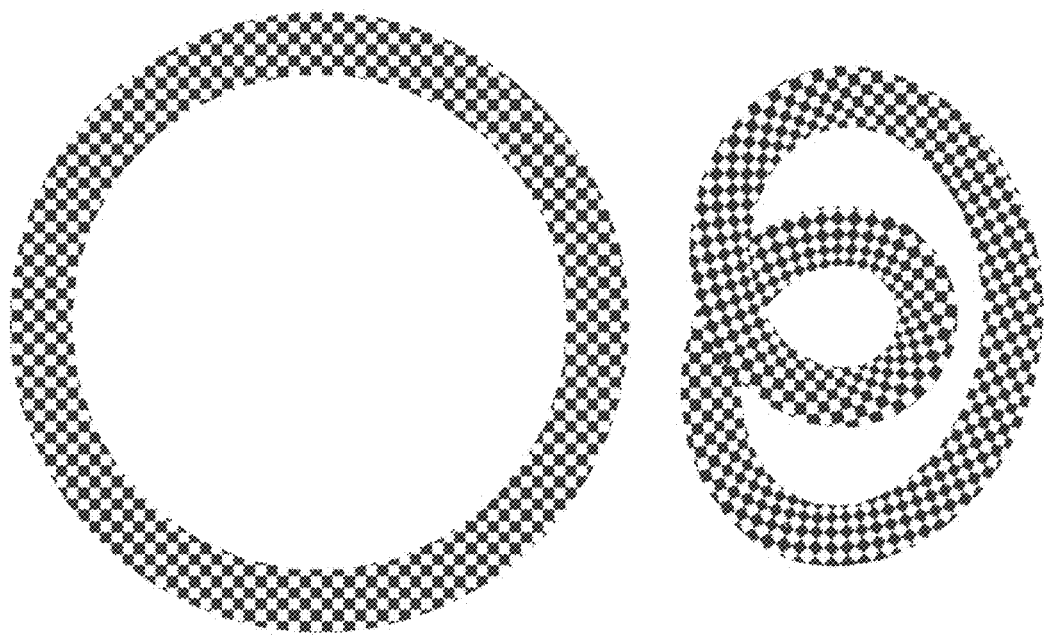
FIG. 2: shows a schematic drawing of a knot.

FIG. 2 shows a schematic drawing of a knot. The left side shows a doubly-connected domain $\Omega$. On the right side, an image of a map $f: \Omega \rightarrow C$ is shown. While f is locally injective, f and the identity are not regular homotopic. Intuitively, one cannot "morph" the annulus on the left to the one on the right continuously without breaking local injectivity. The conditions of Theorem 4.2 on f hold. The integral (Equation (4a)) over the exterior boundary is $2\pi i$ while the integral over the interior one is $-2\pi i$.

As opposed to [Chen and Weber 2015], the inventive deformation algorithm does not explicitly impose user-defined bounds k, $\sigma_1$, $\sigma_2$ on the distortion. Instead, an overall lower average distortion is favored. By using energies that become infinite when the map degenerates at a boundary point, a finite bound on distortion is naturally formed on the boundary. Theorem Bounded Distortion then assures that this bound is also global. At each iteration, the inventive algorithm certifies the map as locally injective by verifying that (4a) holds, as well as the following:

$$|f_z(w)| > |f_{\bar{z}}(w)| \quad \forall w \in \partial\Omega. \tag{5}$$

How to enforce (4a) and (5) in practice is explained in the following description.

According to the present embodiment, equation (3) is discretized to obtain a finite dimensional space of harmonic maps. The holomorphic functions $\tilde{\Phi}$ and $\tilde{\Psi}$ are discretized by using the Cauchy complex barycentric coordinates [Weber et al, 2009] which are derived by approximating the boundary of the domain using a polygonal shape. Let $\hat{P}=\{z_1, z_2, \ldots, z_m\}$, $z_j \in \mathbb{C}$ be the vertices of a multiply-connected planar polygon (the cage). The vertices of the cage are split into sets such that the first set represents the exterior polygon oriented counterclockwise while the following sets represent the interior polygons oriented clockwise.

Figure 3:
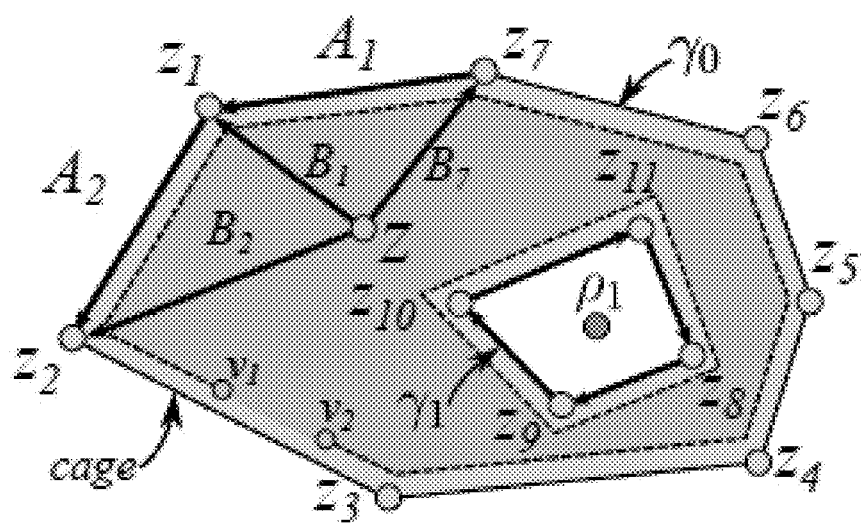
FIG. 3: shows notations.

FIG. 3 shows notations. The purple area is a doubly-connected domain $\Omega$ bounded by a polygon P with 11 vertices. The solid black polygon is an outward offset cage $\hat{P}=\gamma_0 \cup \gamma_1$ with vertices $z_j$ (cyan) composed of exterior polygon $\gamma_0$ oriented counterclockwise, and interior clockwise polygon $\gamma_1$. The point z (green) is in $\Omega$ or on $\partial\Omega$. $A_j = z_j - z_{j-1}$, $B_j(z) = z_j - z$, and $[v_i, v_{i+1}]$ is a small segment (orange) on P. The point $\rho 1$ (red) is in $\gamma_1$.

The holomorphic functions $\tilde{\Phi}$ and $\tilde{\Psi}$ are represented as:

$$\Phi(z) = \sum_{j=1}^{m} \tilde{C}_j(z)\varphi_j \quad \Psi(z) \sum_{j=1}^{m} \tilde{C}_j(z)\psi_j \tag{6}$$

where $\tilde{C}_{j(z)}$ is the $j^{th}$ holomorphic Cauchy barycentric coordinate associated with vertex z, and $\varphi_j$, $\psi_j$ are complex coefficients.

$\tilde{C}_{j(z)}$ possess a rather simple closed-form expression (see Weber Ofir. 2010. Hybrid Methods for Interactive Shape Manipulation. Ph.D. Dissertation. Technion—Israel Institute of Technology). While Weber et al. [2009] assumed that $\hat{P}$ is simply connected, their derivation can be extended to the case of multiple boundary components due to the fact that Cauchy's integral formula still holds. This can be done by integrating the Cauchy kernel over all the boundary components. Practically, representing holomorphic functions on such a domain simply boils down to using additional basis functions that correspond to vertices that lie on the interior boundaries. The complex barycentric map induced by the Cauchy coordinates on multiply-connected domains has a nonempty null space of (complex) dimension 2N which corresponds to a similarity transformation of the vertices of the interior boundary polygons. To remove this ambiguity, the first two complex coefficients of each hole are fixed to zero.

The holomorphic functions $\tilde{\Phi}$ and $\tilde{\Psi}$ in the harmonic decomposition (3) are substituted with the expressions from (6).

The additional term $\Sigma_{i=1}^{N} \ln|z - \rho_i|$ in (3) is substituted with the expression:

$$\sum_{j=m+1}^{m+N} (\varphi_j + \bar{\psi}_j) \ln|z - \rho_{j-m}|, \tag{7}$$

where $\varphi_j$, $\psi_j$ are 2N additional complex coefficients. Splitting $\omega_i$ into two variables creates some unnecessary redundancy, nevertheless it greatly simplifies the exposition as well as the implementation.

Optionally, this redundancy may be removed by enforcing a constraint $\varphi_j = \bar{\psi}_j$, j=m+1, ..., m+N for each hole. Finally, rearranging terms and denoting n=m+N leads to:

$$f(z) = \sum_{j=1}^{n} C_j(z)\varphi_j + \overline{\sum_{j=1}^{n} C_j(z)\psi_j} \tag{8}$$

$$C_j(z) = \begin{cases} \tilde{C}_{j(z)} & j = 1, \ldots, m \\ \ln|z - \rho_{j-m}| & j = m+1, \ldots, n \end{cases}.$$

According to the invention, Equation (8) is the closed-form expression for a finite dimensional harmonic subspace with 2n complex variables $\{\varphi_j, \psi_j\}_{j=1}^{n}$. The dimension of the (complex) null space is 4N+N+1, where 4N is due to the 2 complex DOF per hole for each of the two Cauchy barycentric maps (as explained above), N is due to the redundancy introduced by Equation (7) and the term 1 is due to the constant DOF of the harmonic decomposition (3).

By linearity of the Wirtinger operators, the fact that the derivative of the Cauchy coordinates with respect to $\bar{z}$ is 0, and assuming that $\varphi_j = \bar{\psi}_j$, $\forall j = m+1, \ldots, n$ the Wirtinger derivatives of the harmonic map, just like the map itself, can be expressed in closed-form:

$$f_z(z) = \sum_{j=1}^{n} D_j(z)\varphi_j, \quad \overline{f_{\bar{z}}(z)} = \sum_{j=1}^{n} D_j(z)\psi_j, \tag{9}$$

$$D_j(z) = \begin{cases} \tilde{D}_j(z) & j = 1, \ldots, m \\ \dfrac{1}{z - p_{j-m}} & j = m+1, \ldots, n \end{cases}$$

The derivatives of the Cauchy barycentric coordinates $\tilde{D}_j(z)$ are holomorphic and so is $$\frac{1}{z - p_{j-m}},$$

hence it is clear that $f_z$ and $\overline{f_{\bar{z}}}$ are both holomorphic (though not necessarily integrable).

The main approach in interactive shape deformation is to design and minimize a distortion energy that aggregates a differential quantity that strives to keep the map as-isometric-as-possible. Such differential quantities are minimized when the map is locally isometric. However, since a perfect isometry cannot be obtained in general in the presence of positional constraints, the particular definition of proximity to isometry greatly affects the end result. It is a common practice to measure distortion at a point z as a function $E(z) = E(\sigma_1(z), \sigma_2(z))$ of the two singular values of the Jacobian matrix $J_f(z)$. Such a function is invariant to rigid motions of both the source and the target domains. $E(z)$ should be minimized (at a single point z) if $\sigma_1(z)=\sigma_2(z)=1$. Energies that minimize conformal distortion are also popular. Our harmonic subspace contains many pure (with zero distortion) conformal maps, hence, if desired, we can simply restrict the subspace by eliminating the $\psi_j$ variables and use any of our isometric energies to regularize the result.

Figure 4:
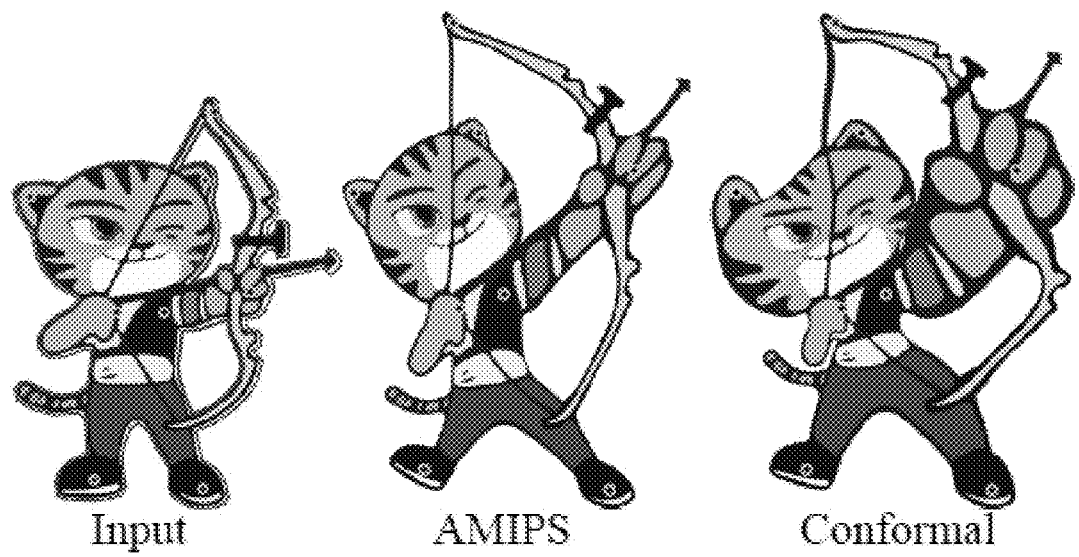
FIG. 4: shows harmonic deformations of a triply-connected domain.

FIG. 4 shows harmonic deformations of a triply-connected domain. The domain on the left has N=2 holes in it. The result in the middle minimizes the Advanced MIPS energy, while the one on the right is a pure conformal map with least isometric distortion.

Appropriate choices of isometric energy for designing locally injective maps become infinite when the map collapses locally, which serves as a natural barrier term. Since our optimization depends on high order derivatives, we focus on energies which are smooth in our variables $\varphi_j$, $\psi_j$. To this end, the distortion measure at z is expressed as a smooth function of $|f_z|^2$ and $|f_{\bar{z}}|^2$. Since $|f_z|^2$ and $|f_{\bar{z}}|^2$ are quadratic functions in $\varphi_j$, $\psi_j$, the composition is also smooth.

FIG. 5 (Table 1) lists several possible choices for such smooth isometric energies. These include the exponential symmetric Dirichlet isometric energy: $E_{exp}=\exp(s \cdot E_{iso})$ (Rabinovich Michael, Poranne Roi, Panozzo Daniele, and Sorkine-Hornung Olga. 2017. Scalable Locally Injective Mappings. ACM Transactions on Graphics 36, 2, Article 16 (2017)). In the first column, an isometric measure is shown in terms of the singular values. In the second column, the isometric measure is shown in terms of $|f_z|^2$, $|f_{\bar{z}}|^2$, which are denoted x, y for clarity. It is straightforward to see that these expressions are smooth in x, y wherever x≠y, which is always the case for the locally injective maps according to the invention. The third column shows the parameters that are needed for instantiating the gradient (17) and the Hessian (18) expressions. The forth column shows the four eigenvalues of K (not necessarily sorted). Potentially negative ones are highlighted.

The motivation to use $E_{exp}$ is to penalize more drastically high values of the distortion measure.

Figure 6:
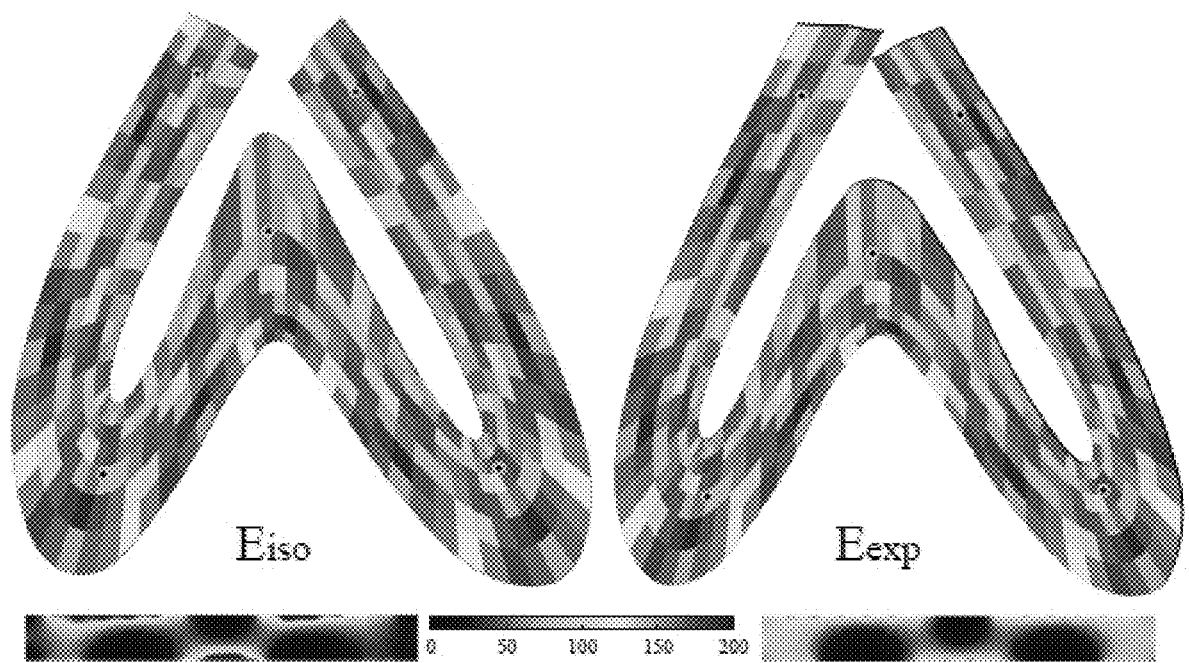
FIG. 6: shows a comparison of isometric energies $E_{iso}$ (left) and $E_{exp}$ (right) used according to different embodiments of the invention.

FIG. 6 shows a comparison of $E_{iso}$ (left) and $E_{exp}$ (right). A straight bar shape is deformed into an extreme pose. Exponentiating the $E_{iso}$ distortion measure reduces the maximal distortion (red color) but increases the average distortion. Both color maps show $E_{iso}$. This allows the user to trade-off low average versus low maximal distortion. Finally, the Advanced MIPS energy (Fu Xiao-Ming, Liu Yang, and Guo Baining. 2015. Computing locally injective mappings by advanced MIPS. ACM Transactions on Graphics 34, 4 (2015), 71) is included, which provides user-controlled balance between area preservation and angle preservation.

According to the invention, the isometric distortion of a planar harmonic map f is defined as a boundary integral over the pointwise distortion quantity E(w):

$$E^f = \oint_{\partial\Omega} E(w)ds. \quad (12)$$

The superscript f is used to denote the boundary integrated distortion and omitted in order to denote the pointwise quantity. Theorem Bounded Distortion ensures that for any bound on E(w) along the boundary, a global upper bound on $\sigma_1(z)$, and a global lower bound on $\sigma_2(z)$ exist. Hence, a global bound on E(z) is naturally formed. Alternatively, an area integral may be chosen instead of the boundary one.

The gradient and the Hessian of the overall isometric energy are:

$$\nabla E^f = \oint_{\partial\Omega} \nabla E(w)ds. \quad (13)$$

$$\nabla^2 E^f = \oint_{\partial\Omega} \nabla^2 E(w)ds. \quad (14)$$

The gradient and the Hessian of our energy measures have relatively simple closed-form expressions. Let $D=D1, D2, \ldots, Dn) \in \mathbb{C}^{1 \times n}$ be a complex row vector, where $D_j$ is defined as in (9). Bold symbols are used to denote real vectors and matrices. Define the real matrix D (note the bold symbol) as:

$$\mathbf{D} = \begin{bmatrix} \mathrm{Re}(D) & -\mathrm{Im}(D) \\ \mathrm{Im}(D) & \mathrm{Re}(D) \end{bmatrix} \in \mathbb{R}^{2 \times 2n} \quad (15)$$

The complex Wirtinger derivatives are expressed as 2×1 real vectors:

$$\mathbf{f}_z = \begin{bmatrix} \mathrm{Re}(f_z) \\ \mathrm{Im}(f_z) \end{bmatrix}, \overline{\mathbf{f}}_{\bar{z}} = \begin{bmatrix} \mathrm{Re}(\overline{f_{\bar{z}}}) \\ \mathrm{Im}(\overline{f_{\bar{z}}}) \end{bmatrix} \quad (16)$$

The gradient of E with respect to the 4n real variables is:

$$\nabla E(z) = 2 \begin{bmatrix} \alpha_1 \mathbf{D}^T \mathbf{f}_z \\ \alpha_2 \mathbf{D}^T \overline{\mathbf{f}}_{\bar{z}} \end{bmatrix} \in \mathbb{R}^{4n \times 1} \quad (17)$$

where $\alpha_1$, $\alpha_2$ are real parameters which depend on the particular choice of energy. Table 1 provides the parameters needed to instantiate some particular energies (out of many possible). The expression for the 4n×4n Hessian of E(z) at a single point is:

$$\nabla^2 E(z) = \begin{bmatrix} \mathbf{D}^T & 0 \\ 0 & \mathbf{D}^T \end{bmatrix} K \begin{bmatrix} \mathbf{D} & 0 \\ 0 & \mathbf{D} \end{bmatrix} \in \mathbb{R}^{4n \times 4n} \quad (18)$$

where K is the a 4×4 real matrix:

$$K = \begin{bmatrix} 2\alpha_1 I + 4\beta_1 \mathbf{f}_z \mathbf{f}_z^T & 4\beta_3 \mathbf{f}_z \overline{\mathbf{f}}_{\bar{z}}^T \\ 4\beta_3 \overline{\mathbf{f}}_{\bar{z}} \mathbf{f}_z^T & 2\alpha_2 I + 4\beta_2 \overline{\mathbf{f}}_{\bar{z}} \overline{\mathbf{f}}_{\bar{z}}^T \end{bmatrix} \in \mathbb{R}^{4 \times 4} \quad (19)$$

The parameters $\beta_1$, $\beta_2$, $\beta_3$ are also energy dependent (see Table 1).

The point-to-point (P2P) metaphor is an intuitive drag-and-drop user-interface that best fits interactive deformation tasks. The user of the inventive method can add or remove (by clicking) positional constraints at any time during interaction. Dragging the P2P handles signals the application to invoke the optimization and to render the updated result. The P2P constraints are incorporated as soft constraints. The P2P energy is defined as:

$$E_{p2p}^f = \frac{1}{2}\sum_{i=1}^{|P|} |f(p_i) - q_i|^2,$$

where $p_i \in P \subset \Omega$ is the position of the $i^{th}$ handle in the source domain, and $q^i \in C$ is its target desired position. The gradient and the Hessian of $E_{p2p}{}^f$ are derived as follows.

The P2P energy at a single handle can be expressed using complex numbers:

$$E_{p2p}(p_i) = \tfrac{1}{2}|f(p_i) - q_i|^2 = \tfrac{1}{2}|C(p_i)\varphi + \overline{C(p_i)\psi} - q_i|^2, \qquad (F.1)$$

where $C(p_i) = (C_1(pi), C_2(pi), \ldots, C_n(pi)) \in C^{1 \times n}$ is a complex row vector, where is defined in (8), and $\varphi, \psi \in C^{n \times 1}$. The complete energy is given by the sum:

$$E_{p2p}^f = \sum_{i=1}^{|P|} E_{p2p}(p_i). \qquad (F.2)$$

Equation (F.1) can be expressed using real numbers:

$$E_{p2p}(p_i) = \frac{1}{2}\left\| Q(p_i)\begin{bmatrix}\varphi \\ \psi\end{bmatrix} - \begin{bmatrix}\mathrm{Re}(q_i) \\ \mathrm{Im}(q_i)\end{bmatrix} \right\|^2,$$

where $Q(p_i)$ is a real matrix defined as:

$$\begin{bmatrix} \mathrm{Re}(C(p_i)) & -\mathrm{Im}(C(p_i)) & \mathrm{Re}(C(p_i)) & -\mathrm{Im}(C(p_i)) \\ \mathrm{Im}(C(p_i)) & \mathrm{Re}(C(p_i)) & -\mathrm{Im}(C(p_i)) & -\mathrm{Re}(C(p_i)) \end{bmatrix} \in \mathfrak{R}^{2 \times 4n}$$

$E_{p2p}(p_i)$ is a quadratic form with constant PSD Hessian matrix:

$$\nabla_2 E_{p2p}(p_i) = Q^T(p_i)Q(p_i) \in \mathfrak{R}^{4n \times 4n} \qquad (F.3)$$

The gradient of the quadratic form is:

$$\nabla^2 E_{p2p}(p_i) = Q^T(p_i)Q(p_i)\begin{bmatrix}\varphi \\ \psi\end{bmatrix} - Q^T(p_i)\begin{bmatrix}\mathrm{Re}(q_i) \\ \mathrm{Im}(q_i)\end{bmatrix}. \qquad (F.4)$$

In order to sum the gradients and the Hessians over all the P2P handles P, one constructs a matrix Q by stacking $Q(p_i)$:

$$Q = \begin{bmatrix} Q(p_1) \\ Q(p_2) \\ \vdots \\ Q(p_{|P|}) \end{bmatrix} \in \mathfrak{R}^{2|P| \times 4n} \qquad (F.5)$$

Finally, the full Hessian and full gradient are given by:

$$\nabla^2 E_{p2p}^f = Q^T Q \qquad (F.6)$$

$$\nabla E_{p2p}^f = Q^T\left(Q\begin{bmatrix}\varphi \\ \psi\end{bmatrix} - q\right) \qquad (F.7)$$

where q is a real column vector stacking the target positions:

$$q = [\mathrm{Re}(q_1), \mathrm{Im}(q_2), \ldots, \mathrm{Re}(q_{|P|}), \mathrm{Im}(q_{|P|})]^T \in \mathfrak{R}^{2|P| \times 1} \qquad (F.8)$$

The full energy of the unconstrained minimization problem is:

$$E_{Def}^f = E^f + \lambda E_{p2p}^f, \qquad (20)$$

where $\lambda$ is a user-defined weight that balances the two terms.

The Hessian of $E_{p2p}{}^f$ is positive semi-definite (PSD). However, the Hessian of $E^f$ is, in general, not PSD, and neither is the Hessian of $E_{Def}{}^f$ (Equation (20)). The key observation here is that the closest (in Frobenius norm) PSD matrix to the Hessian $\nabla^2 E(z) \in \mathfrak{R}^{4n \times 4n}$ at a single point z, can be expressed in closed-form. With that at hand Equation (14) is substituted with:

$$\nabla^2 E^{f+} = \int_{\partial\Omega} \nabla^2 E^+(w) ds, \qquad (21)$$

where $\nabla_2 E^+(w)$ is the closest PSD matrix to $\nabla^2 E(w)$. Since, the integral (or sum) of PSD matrices is PSD (due to the convex cone structure of the PSD set), it is clear that the modified Hessian of the isometric energy (21) is guaranteed to be PSD. Further, the dimension of the null space of (21) in the case of $E_{iso}$ and $E_{exp}$ is 2 or 3. Therefore, with 2 or more positional constraints, $\nabla^2 E^{f+}$ is nonsingular.

Figure 9:
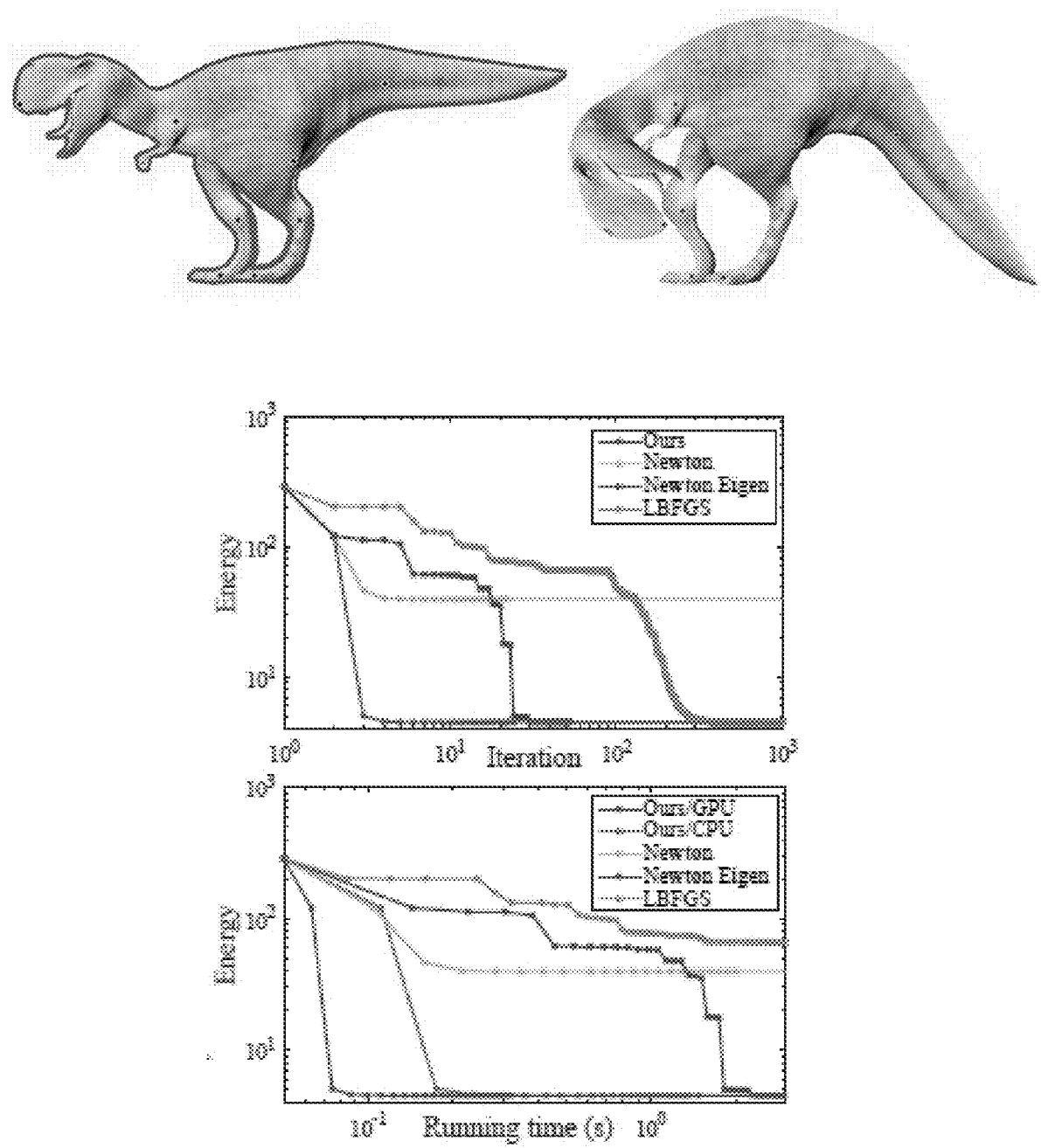
FIG. 9: shows locally injective isometric deformation of Rex, a doubly-connected planar domain (left).
Figures 12, 13:
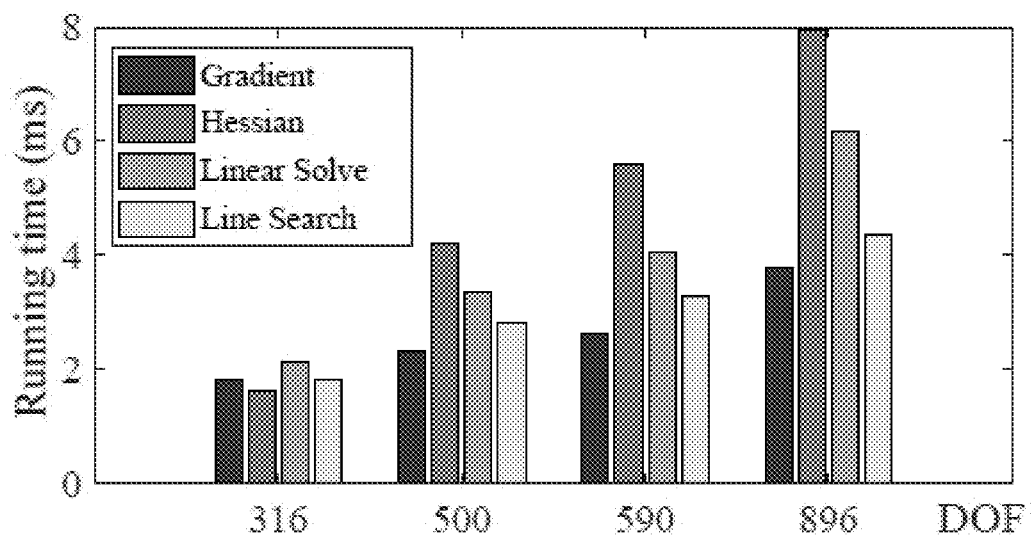
FIG. 12 shows how the runtime of the inventive GPU-based modified-Newton solver is spread across the 4 main stages that compose a single iteration.
FIG. 13 (Table 2) shows a comparison of runtime (ms) of a single iteration.

This application refers to the present variant of Newton's method that computes the closest PSD matrix to $\nabla^2 E^f$ as Newton-Eigen. The modified Newton iterations are dramatically faster to compute. Moreover, throughout extensive experiments, the inventors observed that the local modification leads to iterations which are more effective, where less iterations are required for convergence (FIGS. 9, 12).

Computing the eigen-factorization of the local Hessian matrix $\nabla^2 E$ numerically is impractical. In order to derive an analytic eigen-factorization of a 4n×4n matrix, it is first observed that each of the nontrivial eigenvectors (with nonzero eigenvalue) of $\nabla^2 E$ can be expressed as a product of $$B = \begin{bmatrix} D & 0 \\ 0 & D \end{bmatrix}$$

and a corresponding eigenvector of K (Equation (19)). This is due to the fact that B has 4 rows that are orthogonal to each other (easy to verify by computing the inner product of each pair) and all the rows have the same norm. Furthermore, the eigenvalues of K and $\nabla^2 E$ are the same up to a positive scale. Hence, the above problem can be reduced to analytically computing the eigenvalues of a 4×4 matrix. This is still challenging as these are the roots of a 4th order polynomial. Denote the (unsorted) eigenvalues of K as ($\lambda 1$, $\lambda 2$, $\lambda 3$, $\lambda 4$). It is further observed that $\lambda_1 = 2\alpha 1$ and $\lambda_2 = 2\alpha 2$. To see why $2\alpha_1$ is an eigenvalue, subtract $2\alpha_1$ from the diagonal of K. The first two rows of $K - 2\alpha_1 I$ are:

$$f_z [4\beta_1 f_z^T \; 4\beta_3 \bar{f}_{\bar{z}}^T], \qquad (22)$$

where we can see that the 1×4 row vector on the right hand side of (22) is multiplied by two scalars (the elements of $f_z$), hence, these two rows are linearly dependent, meaning that the matrix $K - 2\alpha_1 I$ is singular and $2\alpha_1$ is a root of the characteristic polynomial. Similarly, it can be shown that $2\alpha_2$ is an eigenvalue. Knowing that $2\alpha_1$ and $2\alpha_2$ are two eigenvalues of K, the other two eigenvalues one can compute by directly solving the quartic characteristic equation. The derivation is long but straightforward, hence omitted. One obtains these expressions:

$$\lambda_{3,4} = s_1 \pm \sqrt{s_2^2 + 16\beta_3^2 |f_z|^2 |f_{\bar{z}}|^2}. \qquad (23)$$

where $s_{1,2} = \alpha_1 + 2\beta_1 |f_z|^2 \pm (\alpha_2 + 2\beta_2 |f_{\bar{z}}|^2)$.

The corresponding four eigenvectors are:

$$(\text{Im}(f_z), -\text{Re}(f_z), 0, 0) \quad (24)$$
$$(0, 0, \text{Im}(\overline{f_{\bar{z}}}), -\text{Re}(\overline{f_{\bar{z}}}))$$
$$(\text{Re}(f_z), \text{Im}(f_z), t_1\text{Re}(f_{\bar{z}}), t_1\text{Im}(f_{\bar{z}}))$$
$$(\text{Re}(f_z), \text{Im}(f_z), t_2\text{Re}(f_{\bar{z}}), t_2\text{Im}(f_{\bar{z}}))$$

where:

$$t_{1,2} = \frac{\lambda_{3,4} - 2\alpha_1 - 4\beta_1|f_{\bar{z}}|^2}{4\beta_3|f_{\bar{z}}|^2}.$$

The signs of these eigenvalues depend on the particular choice of isometric energy, therefore in the most general case, the 4 eigenvalues are evaluated and negative ones are substituted with 0 to obtain the modified Hessian. For particular energy choices, it is possible to simplify matter even more. For the first two energies listed in Table 1, only $\lambda_1 = 2\alpha_1$ can be (at times) negative. This allows to directly express the modified matrix. For example, for $E_{iso}$, it turns out that $\lambda_3$, $\lambda_4$ have quite simple expressions:

$$\lambda_3 = 4(1 + 3(|f_z| + |f_{\bar{z}}|)^{-4}), \lambda_4 = 4(1 + 3(|f_z| - |f_{\bar{z}}|)^{-4}).$$

The spectrum is then sorted as follows: $2\alpha_1 \leq \lambda_3 \leq 2\alpha_2 \leq \lambda_4$. With this information at hand, the modification is done by checking for the sign of $\alpha_1$, and if it is negative, K is substituted in (18) with:

$$K^+ = \begin{bmatrix} \left(\frac{2\alpha_1}{|f_z|^2} + 4\beta_1\right)f_z f_z^T & 4\beta_3 f_z \overline{f_{\bar{z}}}^T \\ 4\beta_3 \overline{f_{\bar{z}}}^T f_z^T & 2\alpha_2 I + 4\beta_2 \overline{f_{\bar{z}}} f_{\bar{z}}^T \end{bmatrix} \quad (25)$$

To ensure that the map is locally injective at each iteration, it needs to be verified that Conditions (4a) and (5) hold, otherwise one needs to backtrack during line search. As (5) involves infinite number of inequalities: $|f_z(w)| > |f_{\bar{z}}(w)|$ $\forall w \in \partial\Omega$, the method uses a simpler sufficient condition based on a finite number of conditions, utilizing the fact that the Wirtinger derivatives are Lipschitz continuous.

Condition (5) can be enforced on the entire boundary by enforcing it (individually) on many small boundary segments. For each segment $[v_i, v_{i+1}]$ (see FIG. 4 for notations), one computes lower and upper bounds for $|f_z|$ and $|f_{\bar{z}}|$ respectively as follows:

$$|f_z|_{min} := \frac{|f_z(v_i)| + |f_z(v_{i+1})|}{2} - \frac{L_{f_z} l}{2} \leq \min_{w \in [v_i, v_{i+1}]} |f_z(w)|,$$

$$|f_{\bar{z}}|_{max} := \frac{|f_{\bar{z}}(v_i)| + |f_{\bar{z}}(v_{i+1})|}{2} + \frac{L_{f_{\bar{z}}} l}{2} \leq \max_{w \in [v_i, v_{i+1}]} |f_{\bar{z}}(w)|.$$

$L_{f_z}$ and $L_{f_{\bar{z}}}$ are the corresponding Lipschitz constants on the segment, and $l = |v_i - v_{i+1}|$. Condition (5) is then substituted with:

$$|f_z(v_i)| - |f_{\bar{z}}(v_i)| + |f_z(v_{i+1})| - |f_{\bar{z}}(v_{i+1})| \geq (L_{f_z} + L_{f_{\bar{z}}}) l, \quad (26)$$

or more concisely:

$$\sigma_2(v_i) + \sigma_2(v_{i+1}) \geq (L_{f_z} + L_{f_{\bar{z}}}) l. \quad (27)$$

It is crucial that the sufficient condition above is as tight as possible, as otherwise the Newton step size may become too small and will stop the Newton iterations prematurely.

The condition becomes tighter as the Lipschitz constants and/or the length of the segment l decrease. Since denser sampling requires more computations, it is advised to obtain as small as possible Lipschitz constants.

According to the invention, the following Lipschitz constants may be used:

$$L_{f_z} = \frac{|f_z'(v_i)| + |f_z'(v_{i+1})|}{2} + \frac{l}{2}\left(\sum_{j=1}^{m} L_j |s_j - s_{j+1}| + \sum_{j=m+1}^{n} L_j^h |\varphi_j|\right)$$

$$L_{f_{\bar{z}}} = \frac{|f_{\bar{z}}'(v_i)| + |f_{\bar{z}}'(v_{i+1})|}{2} + \frac{l}{2}\left(\sum_{j=1}^{m} L_j |t_j - t_{j+1}| + \sum_{j=m+1}^{n} L_j^h |\boldsymbol{t}_j|\right)$$

where $$L_j = \frac{1}{2\pi d^2(z_j)}, \quad L_j^h = \frac{2}{d^3(\rho_j - m)},$$

d(z) is the distance from a point z to the segment, $$s_j = \frac{\varphi_j - \varphi_{j-1}}{z_j - z_{j-1}} \text{ and } t_j = \frac{\boldsymbol{t}_j - \boldsymbol{t}_{j-1}}{z_j - z_{j-1}}.$$

Figure 7:
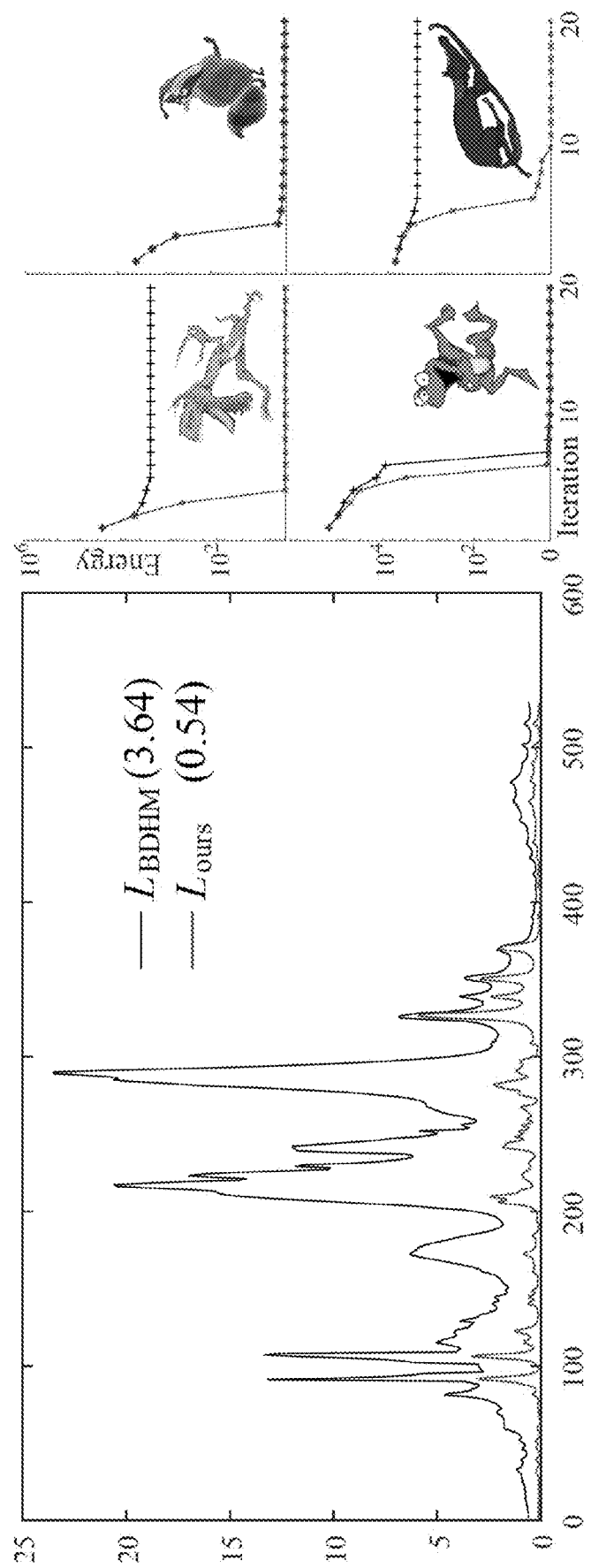
FIG. 7: shows a comparison of Lipschitz constants according to an embodiment of the invention and according to prior art approaches.

FIG. 7 shows a comparison of the Lipschitz constants obtained with the above formulas against known methods. More particularly, FIG. 7 shows on the left a comparison of the Lipschitz constants of fz on 529 boundary segments. $L_{BDHM}$ is the approach taken in [Chen and Weber 2015], while $L_{ours}$ is the improved constants. The above constants are smaller on all the segments with an average (number in parentheses above) which is ×6.74 smaller. The right side shows a comparison of convergence behavior of the inventive solver using BDHM constants (black) vs. invention (red). See how the iterations of the Raptor and Horse deformations stop immaturely when $L_{BDHM}$ is used. In summary, the above given constants are significantly smaller and lead to faster convergence and increased robustness.

Turning now to Condition (4a) requiring that the boundary integral (or equivalently the number of zeros of $f_z$) is 0. The following condition is applicable to multiply-connected domains, and is both necessary and sufficient as long as (27) holds:

Theorem 8.1. Let g(z) be an L-Lipschitz continuous holomorphic function in a neighborhood of a simple open curve with length l and two endpoints $v_i, v_{i+1} \in \mathbb{C}$ such that:

$$|g(v_i)| + |g(v_{i+1})| > Ll, \quad (28)$$

then:

$$\int_{v_i}^{v_{i+1}} \frac{g'(z)}{g(z)} dz = \ln\left|\frac{g(v_{i+1})}{g(v_i)}\right| + i\text{Arg}\left|\frac{g(v_{i+1})}{g(v_i)}\right| \quad (29)$$

where Arg is the principle branch of the complex argument function.

Theorem 8.1 is applicable to $f_z$ along any line segment $[v_i, v_{i+1}]$ since the inventive algorithm always verifies that (27) holds (which implies (28)). Consequently, under the assumption that (27) holds, $f_z$ does not vanish inside the multiply-connected polygon P if and only if:

$$\sum_{j=0}^{N}\sum_{i}\text{Arg}\frac{f_z(v_{i+1}^j)}{f_z(v_i^j)}=0, \qquad (30)$$

where the first summation is over the polygonal loops, and the second one is over the segments in each loop.

To conclude, the method first verifies that (27) holds on all the boundary segments and if so, the sum in (30) is simply computed. If it is zero, the map is guaranteed to be locally injective everywhere.

In general, Newton's method searches for a stationary point of a scalar function $E(x)$ of a vector variable $x \in \mathbb{R}^n$ by iteratively approximating it using its second order Taylor expansion:

$$E(x)=E(x_k+\Delta x)\approx E(x_k)+\Delta x^T \nabla E(x_k)+\tfrac{1}{2}\Delta x^T \nabla^2 E(x_k)\Delta x$$

where $\Delta x = x - x_k \in \mathbb{R}^n$ is the search direction, and $\nabla E \in \mathbb{R}^n$ and $\nabla^2 E \in \mathbb{R}^{n \times n}$ denotes the gradient and the Hessian of E respectively. This second order polynomial in $\Delta x$ has vanishing derivative when the following linear system is satisfied:

$$\nabla^2 E(x_k)\Delta x = -\nabla E(x_k) \qquad (1)$$

The direction $\Delta x$ decreases the energy only if the second order polynomial is convex, or equivalently, the Hessian matrix $\nabla^2 E$ is positive definite. Hence, when needed, the Hessian is modified. The solution to the linear system produces the update for the current iteration $x_{k+1} = x_k + \Delta x$. To ensure convergence (to a local minimum) from an arbitrary starting point, a line search along the search direction $\Delta x$ should be used to find a step size t that satisfies the Wolfe conditions.

FIG. 8 shows, in pseudo-code, an algorithm (Algorithm 1) for a Newton solver used to determine an image deformation map according to an embodiment of the invention.

While the map and its differentials possess closed-form expressions, the contour integrals that arise in Equations (12), (13), (14) may not be solved analytically; therefore, the method resorts to numerical integration. Let $G = \{w_1, w_2, \ldots, w_{|G|}\} \subset \partial \Omega$ an be a set of uniformly distributed samples. Applying the trapezoidal rule to (12), it boils down to a simple sum, due to the uniform sampling:

$$E^f \approx \frac{1}{|G|}\sum_{i=1}^{|G|}E(w_i) \qquad (31)$$

The gradient of $E^f$ is approximated in the same fashion:

$$\nabla E^f \approx \frac{1}{|G|}\sum_{i=1}^{|G|}\nabla E(w_i), \qquad (32)$$

However, it turns out that for the integral approximation of the Hessian, much coarser approximation can be used with negligible influence on the number of Newton iterations (see FIG. 11). Hence, the method uses an additional set H of samples which is a subset of G but contains significantly less samples. The Hessian is approximated:

$$\nabla^2 E^f \approx \frac{1}{|H|}\sum_{i=1}^{|H|}\nabla^2 E^+(w_i), \qquad (33)$$

where $\nabla^2 E^+(w_i)$ is the analytic modification of the pointwise Hessian. We note on a theoretical level, that for any number $|H|$ (as small as it may be), the Newton step produces a descent direction since the matrix $\nabla^2 E^f$ in (33) is guaranteed to be PSD (strict positive definiteness can be ensured by adding E to the diagonal). In the extreme case that H is an empty set, the algorithm degrades to gradient descent. The inventors observed that in practice, choosing $|H|=0.1 |G|$ does not degrade the effectiveness of the Newton iterations and provides a good balance between the time it takes to perform the numerical integration and the other steps of the algorithm. This setting is used in all the results. Moreover, since in practice $|H|$ is much larger than the dimension of our subspace, it is not necessary to add E to the diagonal.

To ensure convergence to a local minimum from an arbitrary starting point the method uses simple backtracking [Nocedal Jorge and Wright Stephen. 2006. Numerical Optimization. Springer New York, Algorithm 3.1] to find a step size that sufficiently decreases the energy (Algorithm 1, Line 17) and in addition ensures that the new map will be locally injective using the above-described strategy (Algorithm 1, Line 18). This requires evaluations of the energy and the Wirtinger derivatives at different step sizes.

The algorithm shown in FIG. 8 can be dramatically accelerated by exploiting parallelism. Most of the steps require only basic dense linear algebra operations and are straightforward to implement. Unlike sparse linear algebra operations, the inventive method greatly benefits when these operations are performed on the GPU, as will be described in the following.

The GPU implementation proposed by the invention is designed in a way that utilizes standard libraries as much as possible. The implementation mostly involves only dense linear algebra operations, while the parts that require coding of a specialized kernel are relatively simple, embarrassingly parallel operations. The inventors have utilized the cuBLAS (cuBLAS. 2017. CUDA Basic Linear Algebra Subroutines. http://developer.nvidia.com/cublas. (2017)), and cuSolverDN (cuSOLVER. 2017. CUDA Linear Solvers Library. http://developer.nvidia.com/cusolver. (2017)) (BLAS and LAPACK implementations) dense linear algebra libraries that are freely distributed with NVIDIA's CUDA toolkit with double precision accuracy. This not only simplifies the implementation, but also ensures that the code will be optimized for different GPU architectures and will run smoothly on any NVIDIA device. Moreover, as graphics hardware constantly evolves and these libraries get optimized further, the speed of such implementation is expected to automatically improve over time.

Regarding matrix and vector notations, the Wirtinger derivatives at a single point can be expressed concisely in vector form:

$$f_z(z)=D(z)\varphi, \overline{f_{\bar{z}}}=D(z)\psi, \qquad (G.1)$$

where $D(z)=(D_1(z), D_2(z), \ldots, D_n(z)) \in \mathbb{C}^{1 \times n}$ is a complex row vector, while $\varphi=(\varphi_1, \varphi_2, \ldots, \varphi_n)^T$ and $\psi=(\psi_1, \psi_2, \ldots, \psi_n)^T$ are complex column vectors.

The complex-valued function f and its differentials have to be evaluated at a large collection of points inside the domain. It would be convenient to express these in matrix notations. For example, assume that one wants to evaluate the map f on a set of points $V \in \Omega$ for the sake of visualization.

In the complex matrix $C(V) \in \mathbb{C}^{|V| \times n}$ the $i^{th}$ row of C corresponds to the point $v_i \in V$ such that $C_{i,j}=C_j(v_i)$. Similarly, the complex matrix $D(V) \in \mathbb{C}^{|V| \times n}$ may be used such that $D_{i,j}=D_j(v_i)$. Using these notations, one may evaluate the map f at the points of the set V by computing the matrix product:

$$[\Phi \ \Psi]_{|V|\times 2} = C(V)[\varphi \ \psi]_{n\times 2}, \qquad (G.2)$$

followed by the computation of the vector sum $\Phi+\overline{\Psi}$. Similarly, one can evaluate the Wirtinger derivatives on the set V with the product:

$$[f_z \ \overline{f_{\bar{z}}}]_{|V|\times 2} = D(V)[\varphi \ \psi]_{n\times 2}, \qquad (G.3)$$

In the preprocessing step (Algorithm 1, line 1), the polygon P is triangulated with a dense triangulation whose vertices form the set V. The triangulation may be used for visualization purposes. Hardware texture mapping may be used to render the final deformed image. The rendering can be performed efficiently on the GPU with extremely high mesh- and texture resolutions without affecting the runtime of the solver. The following matrices are computed and stored on the device's memory:

$$C(V) \in \mathbb{C}^{|V|\times n} \quad C(P) \in \mathbb{C}^{|P|\times n}$$

$$D(G) \in \mathbb{C}^{|G|\times n} \quad D(H) \in \mathbb{C}^{|H|\times n} \qquad (G.4)$$

where V contains the vertices of the triangulation used for texture mapping, P is the set of positional constraints, G is a dense set of samples lying on the polygon P which is used for energy and gradient evaluation, and H is a subset of G used to evaluate the Hessian of the energy. Once the complex matrix D(H) is constructed, it is converted to real form $\mathbf{D} \in \mathbb{R}^{2|H|\times 2n}$ (where the bold symbol denotes a real matrix) as follows:

$$\mathbf{D} = \begin{bmatrix} \text{Re}(D_1) & -\text{Im}(D_1) \\ \text{Im}(D_1) & \text{Re}(D_1) \\ \text{Re}(D_2) & -\text{Im}(D_2) \\ \text{Im}(D_2) & \text{Re}(D_2) \\ \vdots & \vdots \\ \text{Re}(D_{|H|}) & -\text{Im}(D_{|H|}) \\ \text{Im}(D_{|H|}) & \text{Re}(D_{|H|}) \end{bmatrix} \in R^{2|H|\times 2n}, \qquad (G.5)$$

where the subscripts indicates row numbers such that $D_i$ is the $i^{th}$ row of the complex matrix D. Another closely related matrix with the same size which we denote as $\tilde{D}$ is also stored and is obtained from D by swapping each two pair of rows. That is, the $1^{st}$ row is swapped with the $2^{nd}$ one, the $3^{rd}$ with the $4^{th}$ and so on.

Next the implementation computes in parallel a matrix with the coefficients $$L_{i,j} = \frac{1}{2\pi d_i^2(z_j)} \text{ and } L_{i,j}^h = \frac{2}{d_i^3(p_j-m)}.$$

These will be used in runtime to compute the Lipschitz constants of the Wirtinger derivatives. Unlike the Lipschitz constants, these depend only on the cage $\hat{P}$ and the set G, hence, can be precomputed. A simple formula for the distance $d_i(p)$ from a point p to the $i^{th}$ segment is given in Appendix C of [Chen and Weber 2015].

The last step of the preprocessing computes the matrix Q (see Equation (F.5)) and $\nabla^2 E_{p2p}{}^f = Q^T Q$, which is a constant matrix since $E_{p2p}{}^f$ is a quadratic form, hence can be computed and stored once.

Next, the computations are described that are needed to be carried out on each Newton iteration. The evaluation of the map f, its Wirtinger derivatives, energy, and gradient are computed using a matrix-matrix multiplication, where the right term in the product is a "thin" matrix (having many rows but very small number of columns). Such operation is known to be bandwidth limited, meaning that the computation time is dominated by the memory bandwidth of the GPU device. Hence, when performing the product one should strive to minimize the amount of access to the global memory of the device. To this end, the computation are performed using complex numbers and the result is converted back to real numbers when necessary. During runtime, the Wirtinger derivatives are first evaluated at the samples of G using the product:

$$[f_z \ \overline{f_{\bar{z}}}]_{|G|\times 2} = D(G)[\varphi \ \psi]_{n\times 2}, \qquad (G.6)$$

Next, the following is being computed in a single dedicated kernel that accepts the matrix $[f_z \ \overline{f_{\bar{z}}}]$ as input. Each thread handles a row of $[f_z \ \overline{f_{\bar{z}}}]$ (which contains only two complex numbers). The two real scalars $|f_z|^2$ and $|f_{\bar{z}}|^2$, are computed and used to compute the real scalars $\alpha_1, \alpha_2$ using (E.3). Finally, the kernel multiplies $\alpha_1, \alpha_2$ element-wise by the corresponding matrix entries, and store the result as a matrix $[\alpha_1 f_z \ \alpha_2 \overline{f_{\bar{z}}}] \in \mathbb{R}^{|G|\times 2}$. These are embarrassingly parallel operations, which are straightforward to implement in a kernel, where no synchronization is needed and the memory access pattern is perfectly regular.

The next step computes the following complex matrix-matrix product:

$$[g_\varphi \ g_\psi]_{n\times 2} = \frac{2}{|G|} D^H(G)[\alpha_1 f_z \ \alpha_2 \overline{f_{\bar{z}}}]_{|G|\times 2}, \qquad (G.7)$$

where $(\bullet)H$ is the conjugate transpose (hermit) operator. The multiplication in (G.7) is computed by invoking the gemm cuBLAS procedure. Based on the summation in (32), the (real-valued) expression of the gradient of the energy is given by:

$$\nabla E^f = \begin{bmatrix} \text{Re}_{(G_\varphi)} \\ \text{Im}_{(G_\varphi)} \\ \text{Re}_{(G_\psi)} \\ -\text{Im}_{(G_\psi)} \end{bmatrix} \in R^{4n\times 1}. \qquad (G.8)$$

The gradient of the P2P energy also needs to be computed:

$$\nabla E_{p2p}^f = Q^T \left( Q \begin{bmatrix} \varphi \\ \psi \end{bmatrix} - q \right). \qquad (G.9)$$

$Q \in \mathbb{R}^{2|P| \times 4n}$ was already computed in preprocessing, and the vector $q \in \mathbb{R}^{2|P| \times 1}$ contains the target P2P positions (Equation (F.8)).

The computation of the Hessian is the most involved part of the implementation. First, the 4×4 matrix $K_i^+$ that corresponds to the $i^{th}$ sample in H is computed in a dedicated kernel as described above. The real scalars $\alpha_1, \alpha_2, \beta_1, \beta_2, \beta_3$ (Table 1) are computed. Then, based on the energy type, the implementation checks for negative eigenvalues and decides whether to compute $K_i$ (Equation (19)) or its modified version $K_i^+$. In the case of $E_{iso}$, the matrix $K_i^+$ can be computed directly using (25). Otherwise, equations (23) and (24) are used. The entries of all these 4×4 matrices are stored in a matrix $K \in \mathbb{R}^{16 \times |H|}$ where in each column the 16 values of the corresponding matrix $K_i^+$ are stacked.

Unlike the computation of the gradient, which is bandwidth limited, the assembly of the Hessian is a ALU-bound operation, meaning that its runtime is governed by the amount of processing units (and their clock speed) rather than the speed of the global memory. This means that one can expect greater speedup compared to a CPU implementation. Yet, the amount of arithmetic operations involved is vast. The inventive strategy to use coarser sampling (Equation (33)) greatly reduces the Hessian assembly time.

In order to efficiently implement equation (33), the assembly of the Hessian is done separately on each of its four 2n×2n blocks. How to compute the $\nabla_{\varphi^2}^2 E^f$ block is explained below. The blocks for $\nabla_{\varphi\psi}^2 E^f$ and $\nabla_{\psi\psi}^2 E^f$ can be computed analogously. These three blocks are copied into the corresponding position in the 4n×4n full Hessian matrix. Due to symmetry, there is no need to explicitly compute $\nabla_{\psi\psi}^2 E^f$ as it is given by $\nabla_{\psi\psi}^2 E^{f^T}$. Let $$\begin{pmatrix} a_i & b_i \\ c_i & d_i \end{pmatrix}$$

be the 2×2 upper-left block of the matrix $K_i^+$. Note that K (computed earlier) contains the corresponding values for all samples in its rows. The entries of $\nabla_{\varphi^2}^2 E^f$ can be computed using the following formula:

$$\nabla_{\varphi^2}^2 E^f = \frac{1}{|H|} D^T [RD + B\hat{D}], \quad (G.10)$$

where $R \in \mathbb{R}^{2|H| \times 2|H|}$ is a diagonal matrix with diagonal entries $(a_1, d_1, a_2, d_2, \ldots, a_{|H|}, d_{|H|})$ and $B \in \mathbb{R}^{2|H| \times 2|H|}$ is a diagonal matrix with diagonal entries $(b_1, c_1, b_2, c_2, \ldots, b_{|H|}, c_{|H|})$. The advantage of performing the computation in such a way is the ability to use the highly-optimized cuBLAS library [cuBLAS 2017]. The products RD and $B\hat{D}$ in (G.10) are computed using a diagonal matrix-matrix multiplication procedure dgmm followed by a matrix summation (geam) which result in a matrix $M = RD + B\hat{D}$. Finally, the result is obtained through a matrix-matrix product $D^T M$ using gemm. This product dominates the runtime of (G.10).

Then, the gradient and the Hessian of $E_{p2p}^f$ are added to those of $E^f$ (with the appropriate user-defined weight $\lambda$) to form the gradient and the Hessian of the full energy $E^f$ (Equation (20)). The 10N+2 redundant real variables that correspond to the dimension of the null space of the harmonic subspace are then eliminated as explained above. This is done by removing the corresponding rows and columns from the gradient and the Hessian. After that, the Newton step is computed. The freely available cuSolverDN library is used to solve the linear system (1) using the dense GPU-accelerated direct Cholesky factorization.

The solution of the linear system provides the search direction for the Newton iteration. However, this step is not taken immediately. To ensure convergence to a local minimum which corresponds to a locally injective map, a backtracking line search is performed. This requires multiple evaluations of the energy and the local injectivity validation at various step sizes, starting from t=1 and dividing it by 2 at each step until the resulted map is accepted. For a map to be accepted, it is verified first that the energy decreases sufficiently (Algorithm 1, Line 17) and only then the local injectivity validation (Algorithm 1, Line 18) is performed. Both steps require evaluation of the Wirtinger derivatives $f_z^t$ and $\overline{f_{\bar{z}}}^t$ at all samples, which varies depending on t. In general, evaluating these boils down to the same matrix product used in (G.6) for the computation of the gradient. Evaluating it many times can easily become the algorithm's bottleneck. Luckily, since the derivatives are linear in the variables, this can achieved with a single matrix product. The derivatives for step t are given by:

$$\begin{aligned}
\lfloor f_z^t \ \overline{f_{\bar{z}}}^t \rfloor &= D[\varphi^t \ \psi^t] = D[\varphi_k + t\Delta_{\varphi_k} \ \psi_k + t\Delta_{\psi_k}] \\
&= D[\varphi_k \ \psi_k] + tD[\Delta_{\varphi_k} \ \Delta_{\psi_k}]
\end{aligned} \quad (G.11)$$

where $\varphi_k, \psi_k$ are the current state of the (complex) variables and $\Delta\varphi_k \Delta\psi k$ is the Newton search direction. The term on the left was already computed in (G.6). Hence, one only needs to compute the product $D[\Delta\varphi_k \ \Delta\psi_k]$ once, and for each step t, (G.11) boils down to a scalar-matrix multiplication followed by a (thin) matrix summation. Both operations are very efficient. The energy is then evaluated in a dedicated kernel that accepts the matrix $\lfloor f_z^t \overline{f_{\bar{z}}}^t \rfloor$ as input. Each thread handles a row that contains two complex numbers: $f_z^t, \overline{f_{\bar{z}}}^t$, evaluate two real scalars: $|f_z^t|^2, \overline{f_{\bar{z}}}^t$, and use it to compute the scalar E using Table 1. Finally, the kernel performs a parallel reduction summation step to obtain $E^f$ (Equation (31)).

In order to avoid CPU-GPU communication overhead, this step is carried out on the GPU by using the dynamic parallelism feature which allows kernels to invoke other kernels, therefore allows the GPU to execute the line search autonomously.

The iterations are terminated when $t\|\Delta\varphi_k \ \Delta\psi_k\|$ is smaller than $\epsilon = 1e-12$ (Algorithm 1, Line 9). The algorithm always converges.

In contrast, for some inputs, the SLIM and AQP methods struggle to converge to machine precision error even after a thousand iterations.

Upon termination, the map itself is evaluated. This is done as explained in connection with Equation (G.2). Since this product is also performed on the GPU, the result can be used by the GPU directly for rendering, avoiding expensive CPU-GPU transfer times.

For evaluating the performance of the inventive algorithm, the following default parameters for all experiments were used, unless stated otherwise. The number of samples is $|G|=10^4$, and $|H|=0.1 \ |G|$. The two energy terms $E^f$ and $E_{p2p}^f$ are balanced using $\lambda=10^5$. When comparing to mesh-based methods, a mesh with 10,000 vertices is used. User prescribed P2P target positions $q_i$ are visualized as cyan disks. The images of the P2P under the map $f(p_i)$ are visualized as smaller black dots. A black dot which is centered inside a cyan disk indicates P2P satisfaction. The computer runs Windows 10 with Intel Xeon (6 cores) CPU E5-2643 v4 3.40 Ghz, 32 GB, and has an NVIDIA TitanX graphics card.

FIG. 9 shows locally injective isometric deformation of Rex, a doubly-connected planar domain (left). Note the hole between the legs. The harmonic subspace has 392 DOF. The inventive solver converges after 6 iterations to the result depicted, which is computed in 0.072 s when implemented on the GPU, and 0.375 s on the CPU. An unmodified Newton solver halts prematurely after 9 iterations at a high energy configuration due to a non-positive definite Hessian. The Newton-Eigen solver performs a full eigen-factorization Hessian modification at each iteration. It converges after 32 iterations and takes 2.467 s which is ×34 times slower than our GPU solver. The L-BFGS solver performs 1, 818 iterations and is not competitive in terms of runtime.

Figure 10:
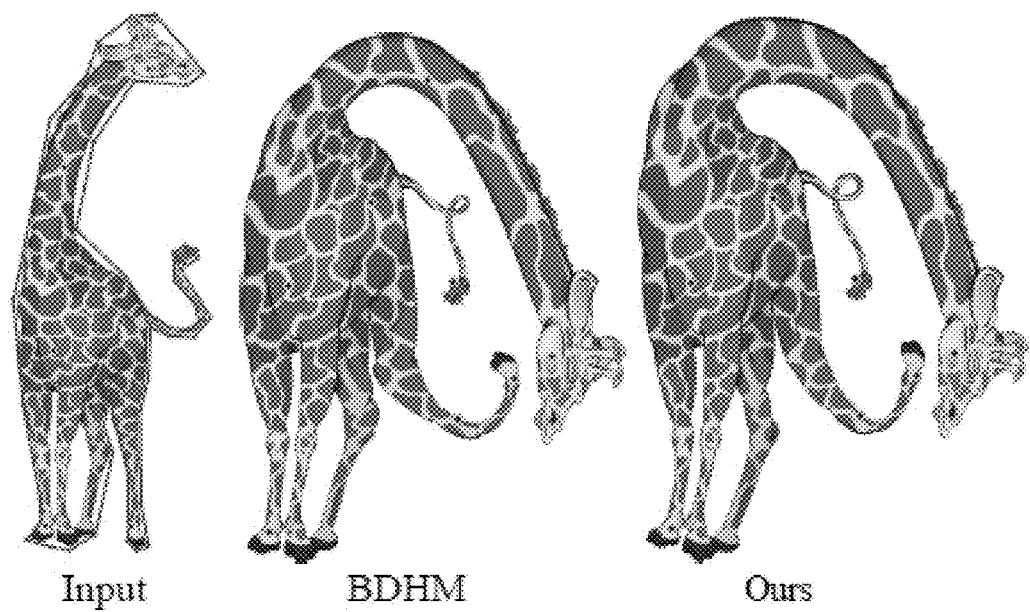
FIG. 10 shows a comparison with BDHM using the same harmonic subspace.

FIG. 10 shows a comparison with BDHM using the same harmonic subspace. User distortion bounds for BDHM are set to: $(k, \sigma_1, \sigma_2)=(0.8, 5, 0.3)$. The resulted map is bounded distortion with bounds (0.50, 4.3, 0.31). Without explicit distortion bounds, the inventive method minimizes the symmetric Dirichlet energy producing a map with bounds (0.32, 2.25, 0.43). The inventive GPU solver converges after 8 iterations with total runtime of 0.0297 s. In comparison, BDHM requires 28 iterations of second order cone programming, with total runtime 3.71 s, which is ×125 slower.

FIG. 11 shows the effect of changing the number of Hessian samples |H| on the inventive algorithm when applied to the depicted deformation of the deer. Similar behavior was observed for other models and deformations. With 200 samples or less, one sees an increase in the number of iterations needed for convergence (left plot). However, with 400 samples, the convergence rate is identical to that of 50,000 (note the three overlapping curves). On the right plot we see that with 50,000 samples, the algorithm becomes 3 times slower due to the longer time it takes to assemble the Hessian, yet, 400 samples are sufficient, in which case the algorithm converges after 30 ms.

FIG. 12 shows how the runtime of the inventive GPU-based modified-Newton solver is spread across the 4 main stages that compose a single iteration. Each group of bins corresponds to a different model with variable amount of degrees of freedom (variables). For all models, |G|=10,000, |H|=1,000. FIG. 12 demonstrates that the inventive solver is well balanced with respect to the four different stages that compose a single Newton iteration: gradient evaluation, Hessian modification-and-assembly, Cholesky linear solve, and line search.

FIG. 13 (Table 2) shows a comparison of runtime (ms) of a single iteration. SLIM and AQP use a mesh with 10, 000 vertices, while the other listed solvers operate within our harmonic subspace with the specified DOF. Table 2 compares the runtime in milliseconds of a single iteration of various algorithms minimizing the symmetric Dirichlet energy. Among all methods, AQP iterations are the fastest (followed by our GPU iterations), albeit we observe that AQP requires significantly larger number of iterations compared to our GPU/CPU Newton solver. Moreover, the initialization required for AQP further slows down the runtime (right most column). For comparisons with AQP we run 5 iterations of ARAP local/global followed by the projection method of Kovalsky et al, 2015 and 2016 (Kovalsky Shahar Z., Aigerman Noam, Basri Ronen, and Lipman Yaron. 2015. Largescale bounded distortion mappings. ACM Transactions on Graphics 34, 6, Article 191 (2015); Kovalsky Shahar Z., Galun Meirav, and Lipman Yaron. 2016. Accelerated Quadratic Proxy for Geometric Optimization. ACM Transactions on Graphics 35, 4, Article 134 (2016)).

Throughout the experiments, the inventors consistently observed that the convergence rate of the inventive algorithm is significantly better than that of the first-order methods (L-BFGS, SLIM, AQP) which is attributed to its second-order nature. Furthermore, the convergence rate is always better even when compared against the Newton-Eigen method which employs a full eigen-factorization [Nocodal and Wright 2006, Equation 3.40] of the Hessian at each iteration, followed by a truncation of negative eigen-values to 1e-10. This is demonstrated in FIG. 9 (6 vs. 32 iters) and FIG. 14 (15 vs. 35 iters) suggesting that the Hessian modification according to the invention is not only faster to compute but also more effective in reducing the energy. Both the eigen-factorization and the solution to the linear system are computed using [cuSOLVER 2017].

The full potential of the inventive deformation algorithm is leveraged when it runs on graphics hardware, yet our CPU parallel Matlab version (which is approximately 5 times slower on average) is still much faster than the alternatives we compare to.

Figure 14:
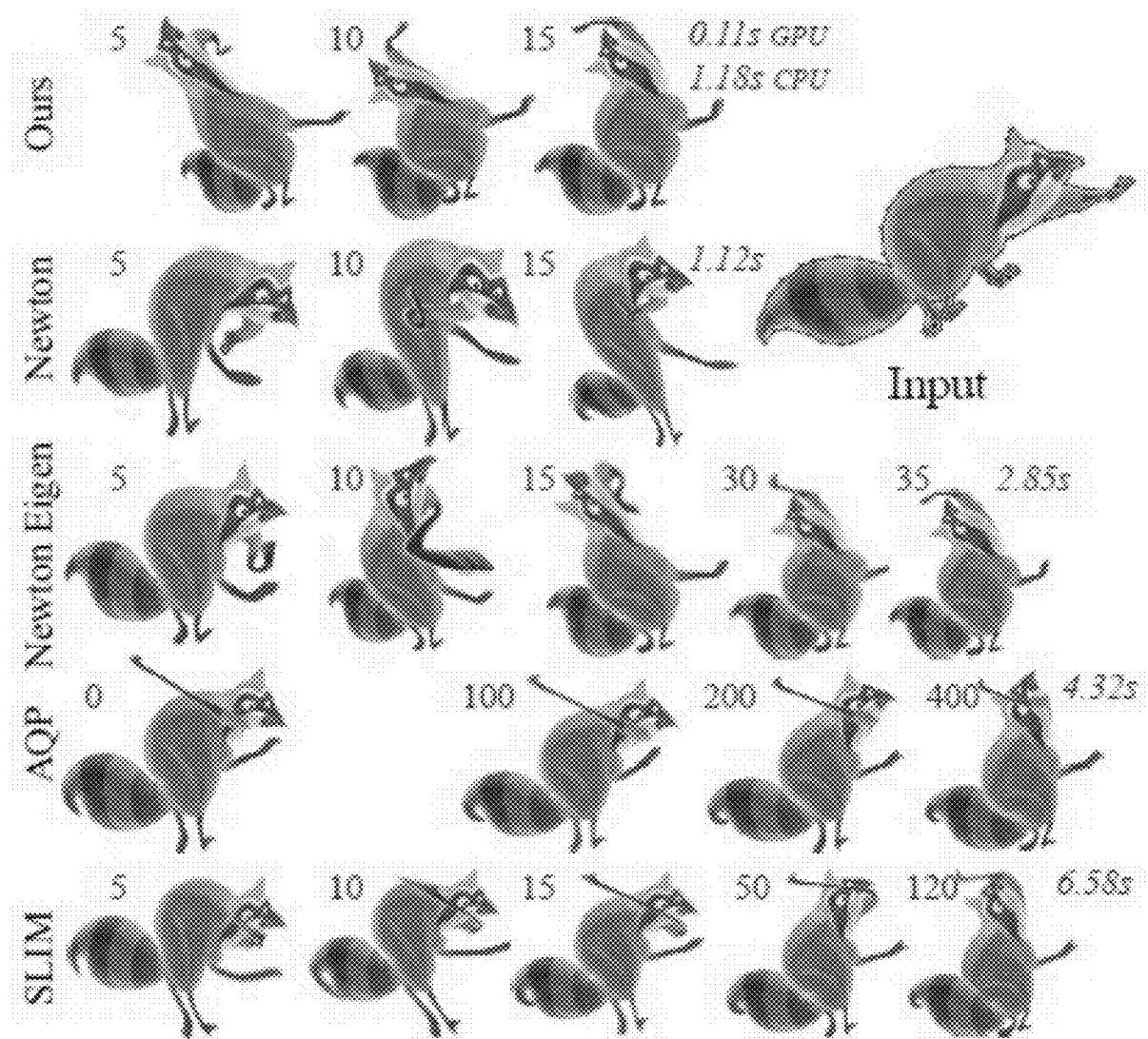
FIGS. 14 and 15 show a visual comparison of our algorithm against state-of the-art methods
Figure 15:
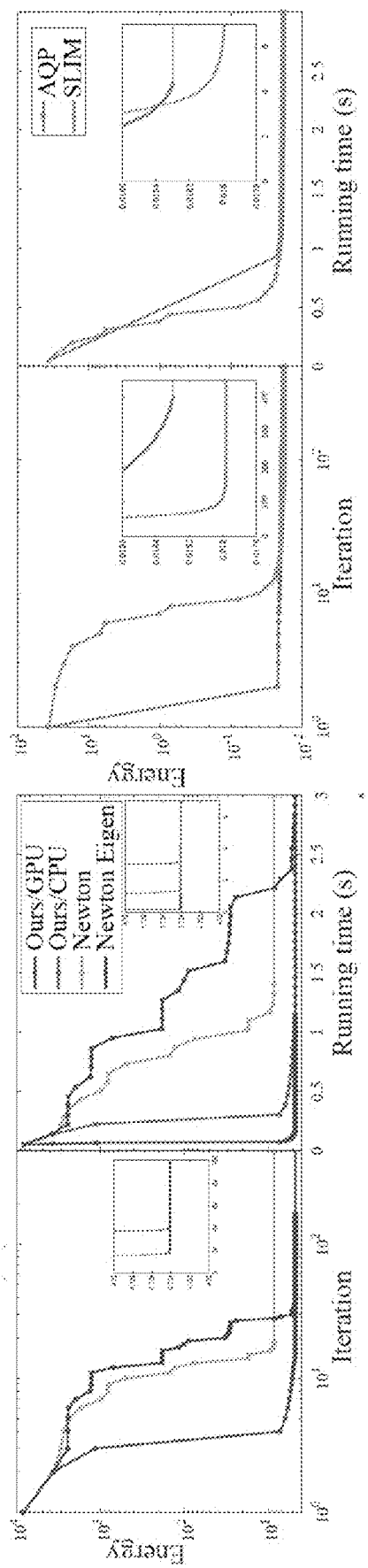

FIGS. 14 and 15 show a visual comparison of our algorithm against state-of-the-art methods minimizing $E_{iso}^f + \lambda E_{p2p}^f$. For each method, small images of the maps obtained at intermediate stages of the algorithm are included to show that for the competing methods, many iterations are needed to get to a state where the progress is not visually apparent. The inventive method is between ×25 to ×58 faster than these competing methods.

More particularly, the top three rows use the harmonic subspace, while AQP and SLIM are general mesh-based methods. The total number of iterations needed for each method as well as the total runtime is reported on the right of each row. The graphs depict the decrease in energy as a function of iteration and as a function of time, separating harmonic from mesh-based methods as they are scaled differently. The "jump" of 0.9 s in AQP's graph (first iteration) is due to the initialization. Note that due to the large weight X, the energy at the first few iterations is very large and $E_{p2p}^f$ obscures the behavior of $E_{iso}^f$. The zoom-in graphs show how the energy decreases more clearly. Our method converges in 15 iterations. Newton's method halts after 15 iterations due to non-positive definite Hessian. Newton-Eigen performs 35 iterations and is ×25 slower than our GPU solver. AQP and SLIM require 400 and 120 iterations and are ×39 and ×58 slower respectively.

Qualitatively, the results obtained with the mesh based methods tend to concentrate the distortion near the positional constraints. Refining the mesh does not seem to alleviate this issue completely while it increases the computation times even further. A mesh resolution of $10^4$ vertices provides a reasonable balance between quality and speed and use it to evaluate AQP and SLIM. The inventive algorithm on the other hand is rather indifferent to the mesh resolution and using a mesh with $10^5$ vertices, leads to extremely smooth results with no degradation in speed.

Figure 16:
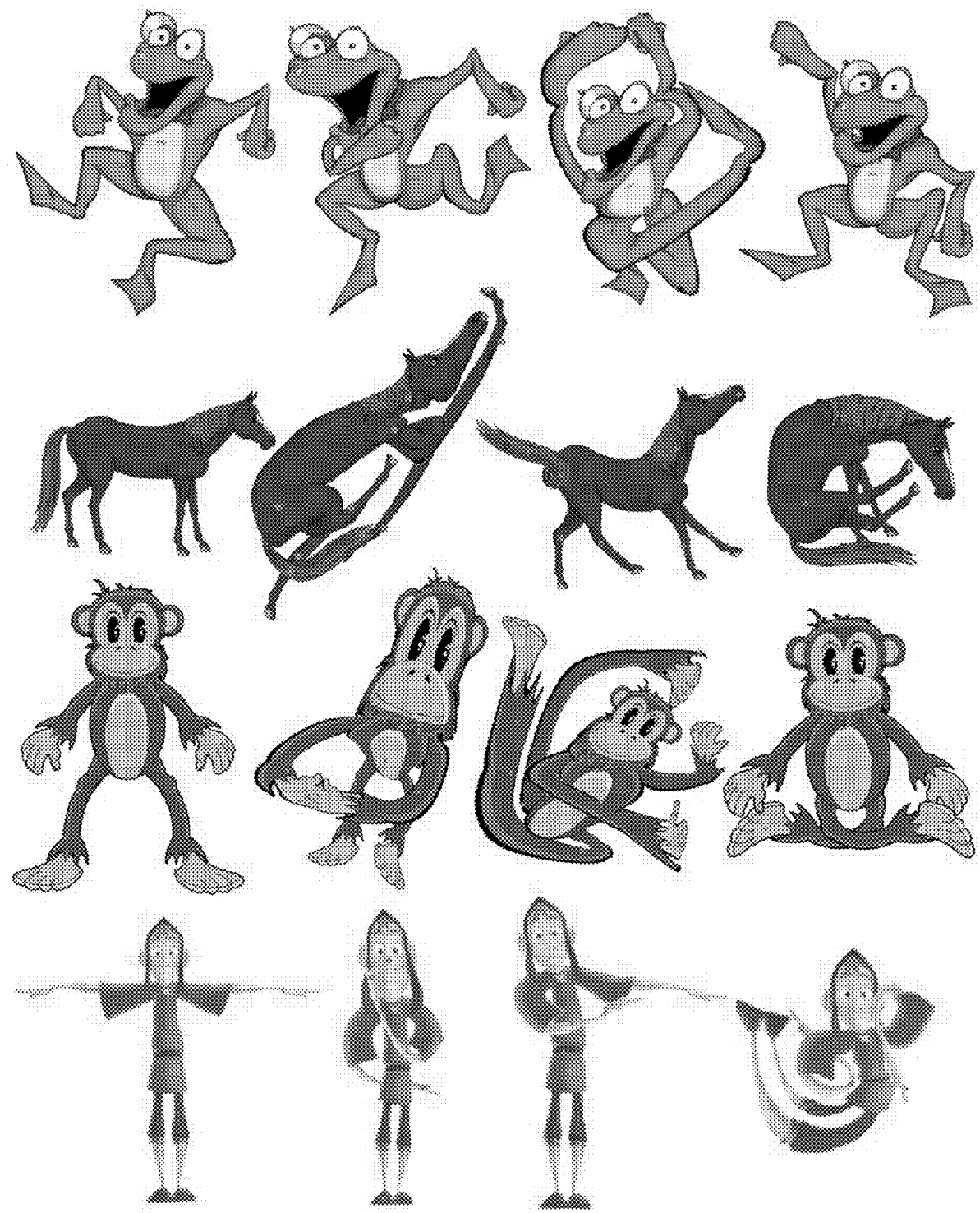
FIG. 16 shows additional results minimizing $E_{iso}{}^f$ rendered at high-resolution.

FIG. 16 shows additional results minimizing $E_{iso}^f$ rendered at high-resolution. Some of these deformations are intentionally radical and are used to stress test the method and to demonstrate robustness. The inventive algorithm quickly converges on these extreme deformations and certifies the maps as locally injective.

We claim:

1. A computer-implemented method for interactive shape deformation, the method comprising:
   obtaining an image;
   extracting a shape from the image, the shape being represented in a multiply connected planar domain comprising an exterior boundary curve ($\gamma_o$) and one or more interior boundary curves ($\gamma_i$), the interior boundary curves forming one or more holes of the shape;
   obtaining one or more positional constraints;
   determining a planar shape deformation map, based on the one or more positional constraints, wherein the planar shape deformation map is determined by minimizing an isometric distortion of the shape deformation, wherein the isometric distortion corresponds to an integral over an isometric energy term;
   applying the shape deformation map to the shape to obtain a deformed shape; and
   outputting the deformed shape,
   characterized in that the integral further corresponds to a boundary integral along the boundary curves ($\gamma_i$) of the shape and in that minimizing the isometric distortion comprises checking whether the distortion is bounded on the boundary curves ($\gamma_i$).

2. The method of claim 1, wherein the shape deformation map is locally injective.

3. The method of claim 2, wherein the shape deformation map is represented in an extended harmonic map space that supports shapes containing holes.

4. The method of claim 2, wherein the step of determining a deformation map is based on an analytic expression for the Hessian of isometric deformation energies.

5. The method of claim 4, wherein the step of determining uses an approximation for the Hessian of the isometric energy.

6. The method of claim 5, wherein the step of determining uses an analytic modification for the Hessian to be positive definite.

7. The method of claim 1, comprising the step of estimating a flip-free condition for harmonic maps.

8. The method of claim 1, wherein a Newton iteration is implemented on one or more GPUs.

9. The method of claim 1, wherein the minimization is performed in a reduced deformable subspace of harmonic maps.

10. An article of manufacture comprising a non-transitory computer-readable medium having program instructions stored thereon, the program instructions, operable on a device and, when executed by a processor on said device, cause said processor to perform the method of claim 1.

11. A device, including hardware including at least one processor and at least one memory, the device programmed to perform the method of claim 1.

12. The method of claim 1, wherein checking whether the distortion is bounded on the boundary curves ($\gamma_i$) comprises verifying that the shape deformation map does not vanish on the boundary curves of the shape.

13. The method of claim 12, wherein verifying that the shape deformation map does not vanish comprises checking whether the map is orientation preserving over each line segment of the boundary polygons.

14. The method of claim 13, wherein checking whether the map is orientation preserving over each line segment of the boundary polygons comprises checking whether the condition $$\sigma_2(v_i)+\sigma_2(v_{i+1}) \geq (L_{f_{\bar{z}}}+L_{f_z})l$$

holds, wherein $\sigma_2$ is the small singular value of the Jacobian, $v_i$ and $v_{i+1}$ are endpoints of the line segment, L are Lipschitz constants and l is a length of the segment.

15. The method of claim 14, wherein verifying that the shape deformation map does not vanish further comprises checking whether a turning angle of its holomorphic component changes on the boundary curves.

16. The method of claim 15, wherein checking whether a turning angle of its holomorphic component changes on the boundary curves comprises checking whether $$\sum_{j=0}^{N}\sum_{i} \text{Arg}\frac{f_z(v_{i+1}^j)}{f_z(v_i^j)} = 0,$$

where the first summation is over polygonal loops representing holes of the shape, the second summation is over the segments in each loop, and wherein Arg is the principal branch of the complex argument function, $f_z$ is the shape deformation map and $v_i^j$ is the i-th point of the j-th loop.

* * * * *